United States Patent [12]
Rabii et al.

(10) Patent No.: US 10,264,208 B2
(45) Date of Patent: Apr. 16, 2019

(54) LAYERED DISPLAY CONTENT FOR WIRELESS DISPLAY

(71) Applicant: QUALCOMM Incorporated, San Diego, CA (US)

(72) Inventors: Khosro Mohammad Rabii, San Diego, CA (US); Vijay Subramaniam, San Diego, CA (US); Fawad Shaukat, San Diego, CA (US); Dat Pham, San Diego, CA (US); Shivakumar Balasubramanyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 14/966,905

(22) Filed: Dec. 11, 2015

(65) Prior Publication Data

US 2017/0171494 A1 Jun. 15, 2017

(51) Int. Cl.
H04N 21/436 (2011.01)
H04N 5/445 (2011.01)
(Continued)

(52) U.S. Cl.
CPC ..... H04N 5/44591 (2013.01); H04L 65/4015 (2013.01); H04L 65/607 (2013.01); H04N 5/44504 (2013.01); H04N 5/44508 (2013.01); H04N 21/4122 (2013.01); H04N 21/431 (2013.01); H04N 21/436 (2013.01); H04N 21/43637 (2013.01); H04N 21/440218 (2013.01); H04N 21/440227 (2013.01); H04N 21/4408 (2013.01); H04N 21/44227 (2013.01); H04N 21/8153 (2013.01)

(58) Field of Classification Search
CPC .. H04N 21/41; H04N 21/436; H04N 21/4363; H04N 21/4402; H04N 21/431; H04N 21/4408; H04N 21/442; H04N 21/81
See application file for complete search history.

(56) References Cited

U.S. PATENT DOCUMENTS 8,891,610 B2   11/2014  Ngo et al.
2006/0083263 A1*  4/2006  Jagadeesan ......... H04L 12/2854
                                            370/487

(Continued)

OTHER PUBLICATIONS

International Search Report and Written Opinion from International Application No. PCT/US2016/056310, dated Jan. 30, 2017, 17 pp.

(Continued)

Primary Examiner — Yassin Alata
(74) Attorney, Agent, or Firm — Shumaker & Sieffert, P.A.

(57) ABSTRACT

A source device of a wireless display system composites display content of a plurality of layers to form composite display content. The source device may output the composite display content for display. Furthermore, the source device may generate a transport stream comprising a plurality of sub-streams. Each respective sub-stream of the plurality of sub-streams comprises data representing the display content of a respective layer of the plurality of layers. The source device may wirelessly transmit the transport stream to one or more sink devices for display by the one or more sink devices.

11 Claims, 14 Drawing Sheets

(51) Int. Cl.
*H04N 21/41* (2011.01)
*H04N 21/431* (2011.01)
*H04N 21/4363* (2011.01)
*H04N 21/4402* (2011.01)
*H04L 29/06* (2006.01)
*H04N 21/4408* (2011.01)
*H04N 21/442* (2011.01)
*H04N 21/81* (2011.01)

(56) References Cited

U.S. PATENT DOCUMENTS

| | | | |
|---|---|---|---|
| 2012/0042275 | A1 | 2/2012 | Neerudu et al. |
| 2013/0047189 | A1 | 2/2013 | Raveendran et al. |
| 2013/0194510 | A1 | 8/2013 | Freundlich et al. |
| 2014/0075486 | A1* | 3/2014 | Wang ............... H04L 67/2823 725/68 |
| 2014/0233629 | A1* | 8/2014 | Lipman ............ H04N 19/436 375/240.01 |
| 2014/0334381 | A1 | 11/2014 | Subramaniam et al. |
| 2015/0295903 | A1* | 10/2015 | Yi ..................... H04L 63/0457 713/153 |
| 2015/0339090 | A1 | 11/2015 | Lee et al. |

OTHER PUBLICATIONS

Partial International Search Report from International Application No. PCT/US2016/056310 dated Dec. 8, 2016, 7 pp.
Response to Written Opinion dated Jan. 30, 2017, from International Application No. PCT/US2016/056310, filed on Apr. 7, 2017, 4 pp.
Zhang et al., "XenSocket: A High-Throughput Interdomain Transport for Virtual Machines," Proceedings of the ACM/IFIP/USENIX 2007 International Conference on Middleware, 2007, 20 pp. (Applicant points out, in accordance with MPEP 609.04(a), that the year of publication, 2007, is sufficiently earlier than the effective U.S. filing date, Dec. 11, 2015, so that the particular month of publication is not in issue.).
Li et al., "A High-Performance Inter-Domain Data Transferring System for Virtual Machines," Journal of Software, vol. 5, No. 2, Feb. 2010, pp. 206-213.
Mohebbi et al., "ZIVM: A Zero-Copy Inter-VM Communication Mechanism for Cloud Computing," Computer and Information Science, vol. 4, No. 6, Nov. 1, 2011, pp. 18-27.
Shapiro et al., "The Measured Performance of a Fast Local IPC," Proceedings of the Fifth International Workshop on Object Orientation in Operating Systems, Oct. 27-28, 1996, 6 pp.
Boutell et al., "PNG (Portable Network Graphics) Specification," Version 1.0, 1996, 81 pp. (Applicant points out, in accordance with MPEP 609.04(a), that the year of publication, 1996, is sufficiently earlier than the effective U.S. filing date, Dec. 11, 2015, so that the particular month of publication is not in issue.).
Brown et al., "Graphics File Formats," Digital Preservation Guidance Note: 4, The National Archives, Issue 2, Aug. 2008, 15 pp.
Deutsch, "GZIP file format specification version 4.3," Network Working Group, RFC 1952, May 1996, 12 pp.
Stevens, "TCP/IP Illustrated, vol. 3, TCP for Transactions, HTTP, NNTP, and the UNIX Domain Protocols," Addison-Wesley, 13th Print, Mar. 2003, 338 pp.
Second Written Opinion from International Application No. PCT/US2016/056310, dated Nov. 29, 2017, 4 pp.
International Preliminary Report on Patentability from International Application No. PCT/US2016/056310, dated Mar. 23, 2018, 17 pp.

* cited by examiner

LAYERED DISPLAY CONTENT FOR WIRELESS DISPLAY

TECHNICAL FIELD

The disclosure relates to transport and playback of media data.

BACKGROUND

Wireless display (WD) systems include a source device and one or more sink devices. A source device may be a device that is capable of transmitting media content within a network, such as a wireless local area network. A sink device may be a device that is capable of receiving and rendering media content. In some examples, a device may be both a source device and a sink device. The source device and the sink device may be either mobile devices or wired devices. As mobile devices, for example, the source device and the sink devices may comprise mobile telephones, portable computers with wireless communication cards, personal digital assistants (PDAs), portable media players, digital image capturing devices, such as cameras or camcorders, or other devices with wireless communication capabilities, including so-called "smart" phones and tablets, or other types of wireless communication devices. As wired devices, for example, the source device and the sink device may comprise televisions, desktop computers, monitors, projectors, printers, set top boxes, game consoles, routers, and digital video disc (DVD) players, and media servers.

A source device may send media data, such as audio video (AV) data, to one or more sink devices participating in a particular media share session. The media data may be played back at both a local display of the source device and at each of the displays of the sink devices. More specifically, each of the participating sink devices may render the received media data for presentation on an associated screen and audio equipment. In some cases, a user of a sink device may apply user inputs to the sink device, such as touch inputs and remote control inputs, to control the content being displayed at the sink device.

SUMMARY

The display content output for display by a source device of a wireless display system may be a composite of multiple display content layers. In conventional wireless display systems, the source device transmits a single stream of encoded composite pictures. However, in accordance with a technique of this disclosure, the source device transmits a transport stream comprising multiple sub-streams. For instance, the source device may transmit an MPEG transport stream. Each of the sub-streams comprises data representing display content of a respective display content layer. A sink device of the wireless display system may receive the transport stream. The sink device may output display content of a single one of the display content layers or may generate composite display content from display content of two or more of the display content layers. In some circumstances, this technique enables a user to control which display content layers are output for display by the sink device. Furthermore, because still image compression codecs may be used to compress the display content of particular display content layers, this technique may reduce the amount of data transmitted by the source device.

In one aspect, this disclosure describes a method for wireless display of display content, the method comprising: compositing, by a source device, display content of a plurality of layers to form composite display content; outputting, by the source device, for display, the composite display content; generating, by the source device, a transport stream comprising a plurality of sub-streams, each respective sub-stream of the plurality of sub-streams comprising data representing the display content of a respective layer of the plurality of layers; and wirelessly transmitting, by the source device, the transport stream to one or more sink devices for display by the one or more sink devices of the display content of one or more of the layers.

In another aspect, this disclosure describes a method for wireless display of display content, the method comprising: wirelessly receiving, by a sink device, a transport stream from a source device, the transport stream comprising a plurality of sub-streams, each respective sub-stream of the plurality of sub-streams comprising data representing display content of a respective layer of a plurality of layers that when composited form display content that is output for display by the source device; compositing, by the sink device, the display content of two or more of the layers to generate composite display content; and outputting, by the sink device, the composite display content for display.

In another aspect, this disclosure describes a source device of a wireless display system, the source device comprising: one or more processors configured to: composite display content of a plurality of layers to form composite display content; output, for display, the composite display content; and generate a transport stream comprising a plurality of sub-streams, each respective sub-stream of the plurality of sub-streams comprising data representing the display content of a respective layer of the plurality of layers; and a transmitter configured to wirelessly transmit the transport stream to one or more sink devices for display by the one or more sink devices of the display content of one or more of the layers.

In another aspect, this disclosure describes a sink device of a wireless display system, the sink device comprising: a receiver configured to wirelessly receive a transport stream from a source device, the transport stream comprising a plurality of sub-streams, each respective sub-stream of the plurality of sub-streams comprising data representing display content of a respective layer of a plurality of layers that when composited form display content that is output for display by the source device; and one or more processors configured to: composite the display content of two or more of the layers to generate composite display content; and output the composite display content for display.

In another aspect, this disclosure describes a source device of a wireless display system, the source device comprising: means for compositing display content of a plurality of layers to form composite display content; means for outputting, for display, the composite display content; means for generating a transport stream comprising a plurality of sub-streams, each respective sub-stream of the plurality of sub-streams comprising data representing the display content of a respective layer of the plurality of layers; and means for wirelessly transmitting the transport stream to one or more sink devices for display by the one or more sink devices of the display content of one or more of the layers.

In another aspect, this disclosure describes a sink device of a wireless display system, the sink device comprising: means for wirelessly receiving a transport stream from a source device, the transport stream comprising a plurality of sub-streams, each respective sub-stream of the plurality of sub-streams comprising data representing display content of a respective layer of a plurality of layers that when composited form display content that is output for display by the source device; means for compositing the display content of two or more of the layers to generate composite display content; and means for outputting the composite display content for display.

In another aspect, this disclosure describes a computer-readable data storage medium having instructions stored thereon that, when executed, configure a source device of a wireless display system to: composite display content of a plurality of layers to form composite display content; output, for display, the composite display content; generate a transport stream comprising a plurality of sub-streams, each respective sub-stream of the plurality of sub-streams comprising data representing the display content of a respective layer of the plurality of layers; and wirelessly transmit the transport stream to one or more sink devices for display by the one or more sink devices of the display content of one or more of the layers.

In another aspect, this disclosure describes a computer-readable data storage medium having instructions stored thereon that, when executed, configure a sink device of a wireless display system to: wirelessly receive a transport stream from a source device, the transport stream comprising a plurality of sub-streams, each respective sub-stream of the plurality of sub-streams comprising data representing display content of a respective layer of a plurality of layers that when composited form display content that is output for display by the source device; composite the display content of two or more of the layers to generate composite display content; and output the composite display content for display.

The details of one or more examples of the disclosure are set forth in the accompanying drawings and the description below. Other features, objects, and advantages will be apparent from the description, drawings, and claims.

DETAILED DESCRIPTION

Figure 1:
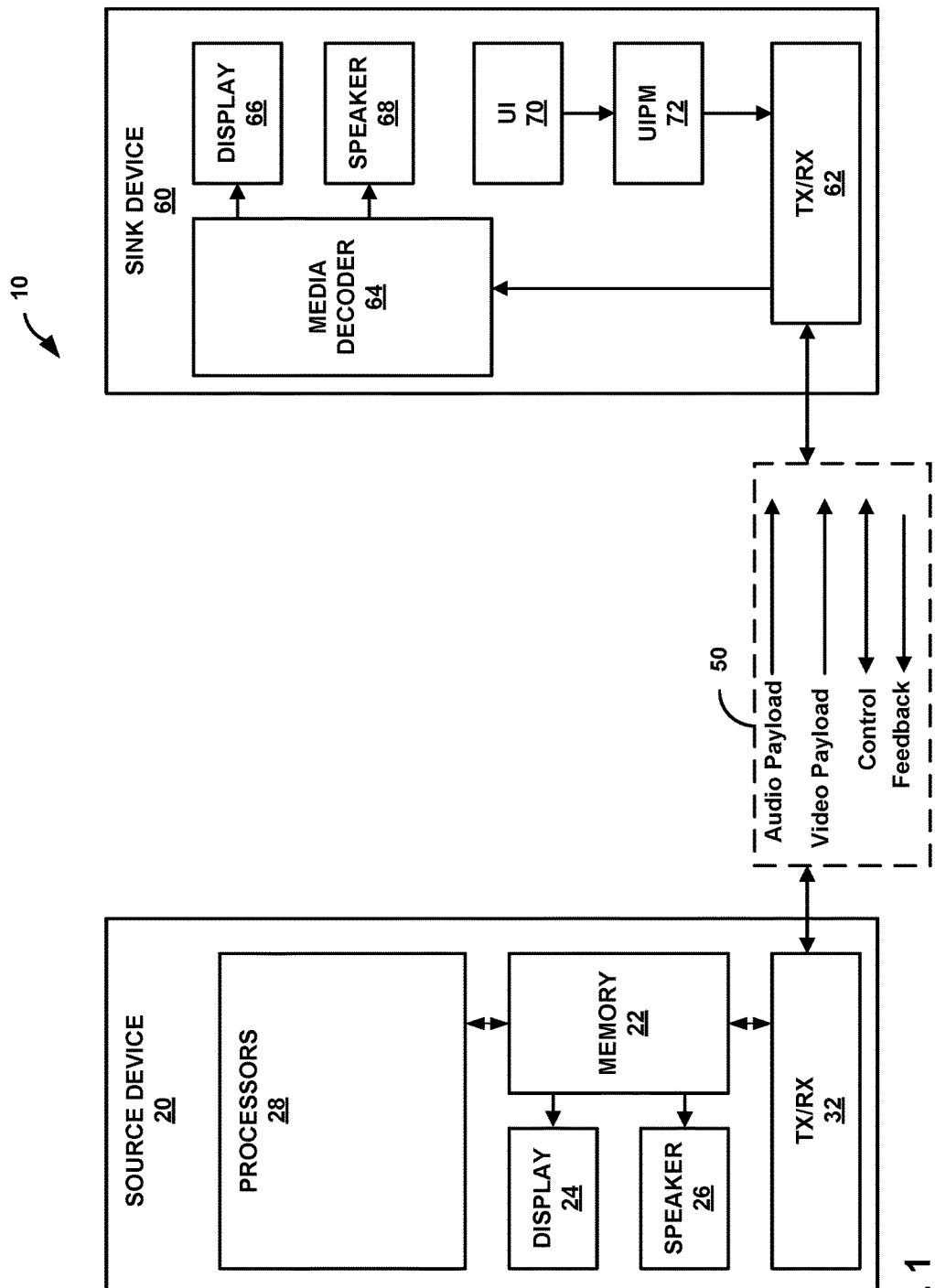
FIG. 1 is a block diagram illustrating a wireless display system that includes a source device and a sink device.

In general, this disclosure relates to techniques for transmitting display content in a Wireless Display (WD) system. Display content may include video content (e.g., moving picture information), relatively static screen content, or other types of visual content for display. In a WD system, a source device encodes display content and transmits the encoded display content over a wireless channel to a sink device. The sink device may decode the encoded display content and may output the decoded display content for display on a display screen.

When a wireless display technology is used, typically the entire display content of the source device screen is replicated on the sink device screen. However, screen content is typically a composition of multiple layers of display content. For example, a notification window may pop up over an application window. In this example, the notification window corresponds to one layer and the application window corresponds to a different layer. In another example, a YouTube video may correspond to one layer and the play/pause/stop controls for the video may correspond to a different layer. In another example, different windows may correspond to different layers.

In conventional wireless-display technologies, the display content of such layers are flattened into a series of composite pictures for transport to the sink device as a video stream, such as a Motion Pictures Experts Group (MPEG) transport stream. There are several drawbacks associated with this approach. For instance, encoding the video stream may be somewhat time consuming, resulting in delayed response times. Furthermore, it may not be desirable to display all of the display content of the source device on a particular sink device. For example, the sink device may be a smartwatch. In this example, it may be desirable to display notification windows, but not other types of display content. Current wireless display technologies do not allow for such behavior, or do not allow for such behavior without significant processing power at the sink device.

This disclosure describes a wireless display technology in which layers of display content are kept separate throughout the process of sending display content to sink devices. Particularly, the source device may generate a transport stream (e.g., an MPEG-2 transport stream) in which different sub-streams contain data representing display content of different layers. Because different layers are treated as different sub-streams, different sets of the layers may be output for display by different sink devices. For instance, a smartwatch may display display content of notification layers, but not the display content of other layers shown on the source device's display. Furthermore, because different layers are treated as different sub-streams, different rights-management can be applied to different layers. For instance, layers containing notifications may be encrypted or scrambled such that only a user's smartwatch can display the notifications, while a television or projector device cannot display the notifications. In this disclosure, a device may output display content for display in various ways. For example, a device may send, generate, or otherwise output information directly or indirectly to a display unit that it capable of processing the information to display the display content. In some instances, the information may be sent via a cable, a network, or another wired or wireless communication media.

Because the display content of many layers does not contain naturally moving content, it may be more efficient from a compressing and coding time standpoint to encode the display content of layers using a still image compression technique instead of a video compression technique. For instance, the display content of particular layers can be compressed using the PNG format. The PNG format is fast and may attain compression ratios far greater than those attainable by video compression techniques. Furthermore, the PNG format is lossless.

Thus, in accordance with an example of this disclosure, a source device may composite or compose display content of a plurality of layers to form composite display content. In this example, the source device may output, for display, the composite display content. Furthermore, the source device may generate a transport stream comprising a plurality of sub-streams. For instance, the source device may generate an MPEG-2 transport stream or another type of transport stream. Each respective sub-stream of the plurality of sub-streams may comprise data representing the display content of a respective layer of the plurality of layers. The source device may wirelessly transmit the transport stream to one or more sink devices for display by the one or more sink devices. In this example, a sink device may wirelessly receive the transport stream from the source device. The sink device may composite the display content of two or more of the layers to generate composite display content. The sink device may output the composite display content for display.

FIG. 1 is a block diagram illustrating an example of a Wireless Display (WD) system 10 in which the techniques of this disclosure may be implemented. FIG. 1 and the following figures are provided for purposes of explanation and should not be considered limiting of the techniques as broadly exemplified and described in this disclosure.

In the example of FIG. 1, WD system 10 includes a source device 20 and a sink device 60. Source device 20 may include various types of devices. For instance, source device 20 may include a telephone handset, a tablet computer, a personal computer, a video game console, or another type of device. Likewise, sink device 60 may include various types of devices. For instance, sink device 60 may include a telephone handset, a television, a video stick or dongle, a personal computer, a tablet computer, a video projector, a wearable computing device, or another type of device.

Source device 20 may communicate with sink device 60 via a wireless channel 50. In the example of FIG. 1, source device 20 includes a memory 22, a display 24, a speaker 26, a set of processors 28, and a transmitter/receiver (TX/RX) unit 32. In the example of FIG. 1, sink device 60 includes a transmitter/receiver unit (TX/RX) 62, a media decoder 64, a display 66, a speaker 68, a user input (UI) device 70, and a user input processing module (UIPM) 72. Media decoder 64, UIPM 72, and TX/RX 62 together or separately may comprise one or more processors. The illustrated components constitute merely one example configuration for WD system 10. Other configurations may include more, fewer, or different components than those illustrated or may include components in addition to those illustrated.

In the example of FIG. 1, source device 20 can display the video portion of media data on display 24 and can output the audio portion of media data using speaker 26. Media data may be stored locally on memory 22, accessed from an external storage medium such as a file server, hard drive, external memory, Blu-ray disc, DVD, or other physical storage medium, or may be streamed to source device 20 via a network connection such as the Internet. In some instances, media data may be captured in real-time via a camera and/or microphone of source device 20. Media data may include multimedia content such as movies, television shows, or music, and may also include real-time content generated by source device 20. Such real-time content may, for example, be produced by applications running on source device 20, or captured, e.g., as part of a video telephony session. Such real-time content may, in some instances, include a picture of user input options available for a user to select. In some instances, media data may include pictures that are a combination of different types of content, such as a picture of a movie or TV program that has user input options overlaid on the picture. Furthermore, in some examples, source device 20 may generate the media content internally. For instance, the media content may comprise video game content, computer desktop window content, application-generated display content, and so on. Display content may be media content or a portion of media content for display.

In addition to rendering media data locally via display 24 and speaker 26, processors 28 of source device 20 can encode media data and TX/RX unit 32 can transmit the encoded media data over wireless channel 50 to sink device 60. In some examples, processors 28 may re-encode already encoded media data. In other words, processors 28 may transcode media data. TX/RX unit 62 of sink device 60 may receive the encoded media data, and media decoder 64 may decode the encoded media data and output the decoded media data for presentation on display 66 and speaker 68. In this manner, the audio and display content being rendered by display 24 and speaker 26 can be nearly simultaneously rendered by display 66 and speaker 68. The audio data and display content may be arranged in frames, and the audio frames may be time-synchronized with the video frames (i.e., pictures) when rendered.

Processors 28 and media decoder 64 may include encoder/decoder (CODEC) units that implement various audio and video compression standards, such as the ITU-T H.264 standard, alternatively referred to as MPEG-4, Part 10, Advanced Video Coding (AVC), or the high efficiency video coding (HEVC) standard. Many other types of proprietary or standardized compression techniques may also be used. Generally speaking, media decoder 64 is configured to perform the reciprocal coding operations of processors 28. Although not shown in FIG. 1, in some aspects, processors 28 and media decoder 64 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Processors 28 of source device 20 may also perform other encoding functions in addition to implementing a video compression standard as described above. For example, processors 28 may add various types of metadata to media data prior to the media data being transmitted to sink device 60. In some instances, media data may be stored on or received at source device 20 in an encoded form and thus not require further compression by processors 28. For ease of explanation, this disclosure may describe actions performed by processors 28 as actions performed by source device 20 generally.

Although FIG. 1 shows wireless channel 50 carrying audio payload data and video payload data separately, it is to be understood that in some instances video payload data and audio payload data may be part of a common data stream, and may be multiplexed or otherwise interleaved with one another. Furthermore, in some instances, no audio data is transmitted. Processors 28 and media decoder 64 each may be implemented as one or more microprocessors, digital signal processors (DSPs), application specific integrated circuits (ASICs), field programmable gate arrays (FPGAs), discrete logic, software, hardware, firmware or any combinations thereof. In examples where one or more aspects are implemented in software, underlying hardware (e.g., in the form of a programmable processor) may execute the software. Each of processors 28 and media decoder 64 include in one or more encoders or decoders, either of which may be integrated as part of a combined encoder/decoder (CODEC). Thus, each of source device 20 and sink device 60 may comprise specialized machines configured to execute one or more of the techniques of this disclosure.

Display 24 and display 66 may comprise any of a variety of video output devices such as a cathode ray tube (CRT) display, a liquid crystal display (LCD), a plasma display, a light emitting diode (LED) display, an organic light emitting diode (OLED) display, or another type of display device. In these or other examples, display 24 and 66 may each be emissive displays or transmissive displays. Display 24 and display 66 may also be touch displays such that they are simultaneously both input devices and display devices. Such touch displays may be capacitive, resistive, or other types of touch panel that allows users to provide user input to the respective devices.

Speaker 26 and speaker 68 may comprise any of a variety of audio output devices such as headphones, single-speaker systems, multi-speaker systems, or surround sound systems. Additionally, although display 24 and speaker 26 are shown as part of source device 20 and display 66 and speaker 68 are shown as part of sink device 60, source device 20 and sink device 60 may in fact be a system of devices. As one example, display 66 may be a television, speaker 68 may be a surround sound system, and media decoder 64 may be part of an external box connected, either wired or wirelessly, to display 66 and speaker 68. In other instances, sink device 60 may be a single device, such as a tablet computer or smartphone. In still other cases, source device 20 and sink device 60 are similar devices, e.g., both being smartphones, tablet computers, or the like. In this case, one device may operate as the source and the other may operate as the sink. These roles may be reversed in subsequent communication sessions. Furthermore, in some examples, source device 20 and sink device 60 may simultaneously engage in two-way streaming. In still other cases, source device 20 may comprise a mobile device, such as a smartphone, laptop or tablet computer, and sink device 60 may comprise a more stationary device (e.g., with an alternating current power cord), in which case source device 20 may deliver audio and display content for presentation to one or more viewers via sink device 60.

TX/RX unit 32 and TX/RX unit 62 may each include various mixers, filters, amplifiers and other components designed for signal modulation, as well as one or more antennas and other components designed for transmitting and receiving data. Wireless channel 50 generally represents any suitable communication medium, or collection of different communication media, for transmitting media data, control data and feedback between source device 20 and sink device 60. Wireless channel 50 is usually a relatively short-range communication channel, and may implement a physical channel structure similar to Wi-Fi, Bluetooth, or the like, such as implementing defined 2.4, GHz, 3.6 GHz, 5 GHz, 60 GHz or Ultrawideband (UWB) frequency band structures. However, wireless channel 50 is not necessarily limited in this respect, and may comprise a wireless communication medium, such as a radio frequency (RF) spectrum or one or more physical transmission lines, or a combination of wireless and wired media. In other examples, wireless channel 50 may form part of a packet-based network, such as a wired or wireless local area network, a wide-area network, or a global network such as the Internet. Additionally, wireless channel 50 may be used by source device 20 and sink device 60 to create a peer-to-peer link.

Source device 20 and sink device 60 may establish a communication session according to a capability negotiation using, for example, Real-Time Streaming Protocol (RTSP) control messages. In one example, a request to establish a communication session may be sent by source device 20 to sink device 60. Once the communication session is established, source device 20 may transmit media data, e.g., audio video (AV) data, to sink device 60. Source device 20 may transmit media data to sink device 60, for example, using the Real-time Transport protocol (RTP). Sink device 60 may render the received media data on display 66 and speaker 68.

Source device 20 and sink device 60 may communicate over wireless channel 50 using a communications protocol such as a standard from the IEEE 802.11 family of standards. In one example, wireless channel 50 may be a network communication channel. In this example, a communication service provider may centrally operate and administer the network using a base station as a network hub. Source device 20 and sink device 60 may, for example, communicate according to the Wi-Fi Direct or Wi-Fi Display (WFD) standards, such that source device 20 and sink device 60 may communicate directly with one another without the use of an intermediary such as a wireless access point or a so-called hotspot. Relatively short distance in this context may refer to, for example, less than approximately seventy meters, although in a noisy or obstructed environment, the distance between devices may be even shorter, such as less than approximately thirty-five meters, or less than approximately twenty meters.

The techniques of this disclosure may at times be described with respect to WFD, but it is contemplated that aspects of these techniques may also be compatible with other communication protocols. By way of example and not limitation, the wireless communication between source device 20 and sink device 60 may utilize orthogonal frequency division multiplexing (OFDM) techniques. A wide variety of other wireless communication techniques may also be used, including but not limited to time division multiple access (TDMA), frequency division multiple access (FDMA), code division multiple access (CDMA), or any combination of OFDM, FDMA, TDMA and/or CDMA. Still other wireless communication techniques include standards from the Bluetooth™ family of standards.

In addition to decoding and rendering media data received from source device 20, sink device 60 can also receive user inputs from user input device 70. User input device 70 may, for example, include a keyboard, mouse, electronic pen, trackball or track pad, touch screen, voice command recognition module, or any other such user input device. UIPM 72 may format user input commands received by user input device 70 into a data packet structure that source device 20 is capable of processing. Such data packets may be transmitted by TX/RX unit 62 to source device 20 over wireless channel 50.

TX/RX unit 32 may receive the data packets, and processors 28 may parse the data packets to interpret a user input command that was received by user input device 70. Based on the user input command received in the data packet, processors 28 may change the media content being encoded and transmitted. In this manner, a user of sink device 60 can control the media data being transmitted by source device 20 remotely and without directly interacting with source device 20.

Additionally, users of sink device 60 may be able to launch and control applications on source device 20. As an illustration, a user of sink device 60 may able to launch a photo editing application stored on source device 20 and use the application to edit a photo that is stored locally on source device 20. Sink device 60 may present a user with a user experience that looks and feels like the photo is being edited locally on sink device 60 while in fact the photo is being edited on source device 20. Using such a configuration, a user may be able to leverage the capabilities of one device for use with several devices. For example, source device 20 may comprise a smartphone with a large amount of memory and high-end processing capabilities. When watching a movie, however, the user may wish to watch the movie on a device with a bigger display screen, in which case sink device 60 may be a tablet computer or even larger display device or television. When wanting to send or respond to email, the user may wish to use a device with a physical keyboard, in which case sink device 60 may be a laptop. In both instances, the bulk of the processing may still be performed by source device 20 even though the user is interacting with sink device 60. Source device 20 and sink device 60 may facilitate two way interactions by transmitting control data, such as, data used to negotiate and/or identify the capabilities of the devices in any given session over wireless channel 50.

User inputs applied at sink device 60 may be sent back to source device 20 over wireless channel 50. In one example, a reverse channel architecture, also referred to as a user interface back channel (UIBC) may be implemented to enable sink device 60 to transmit the user inputs applied at sink device 60 to source device 20. The UIBC architecture may include upper layer messages for transporting user inputs, and lower layer messages for negotiating user interface capabilities at sink device 60 and source device 20. The UIBC may reside over the Internet Protocol (IP) transport layer between sink device 60 and source device 20. In this manner, the UIBC may be above the transport layer in the Open System Interconnection (OSI) communication model. To promote reliable transmission and in-sequence delivery of data packets containing user input data, UIBC may be configured to run on top of other packet-based communication protocols such as the transmission control protocol/internet protocol (TCP/IP) or the user datagram protocol (UDP). UDP and TCP may operate in parallel in the OSI layer architecture. TCP/IP may enable sink device 60 and source device 20 to implement retransmission techniques in the event of packet loss.

In some examples, source device 20 may send encoded audio and display content to sink device 60 in a transport stream. A transport stream may be a stream of data for transporting media data for digital transmission or storage. A transport stream may be a multiplex of two or more separate sub-streams. In this disclosure, a sub-stream may correspond to a stream within a transport stream. In the context of the MPEG-2 System specification, such sub-streams may be programs or elementary streams. In some examples, each of the sub-streams may be decoded independently. For instance, two sub-streams in a transport stream may contain encoded video data of two separate video feeds. Other elementary streams may include audio data, metadata, or other types of data. Elementary streams within a transport stream may be organized into programs. Thus, a program may comprise a set of elementary streams within a transport stream. For instance, a first program of a transport stream may include elementary streams A, B, and C, while a second program of the same transport stream may include elementary streams D and E. Other elementary streams within a transport stream may include data describing the organization of the transport stream.

The MPEG-2 Systems specification describes how compressed multimedia (video and audio) data streams may be multiplexed together with other data to form a single data stream suitable for digital transmission or storage. The MPEG-2 Systems specification defines the concept of an elementary stream. Specifically, an elementary stream is a single, digitally coded (possibly MPEG-compressed) component of a program. For example, encoded video or audio parts of the program can be an elementary stream. An elementary stream is firstly converted into a packetized elementary stream (PES) before being multiplexed into a program stream or transport stream. Within the same program, stream_id is used to distinguish the PES-packets belonging to one elementary stream from another.

The MPEG-2 Systems specification defines the concepts of a program stream and a transport stream. Program streams and transport streams are two alternative multiplexes targeting different applications. Program streams are biased for the storage and display of a single program from a digital storage service and a program stream is intended for use in error-free environments because it is rather susceptible to errors. In contrast, transport streams are intended for the simultaneous delivery of a number of programs over potentially error-prone channels. In general, a transport stream is a multiplex devised for multi-program applications such as broadcasting, so that a single transport stream can accommodate many independent programs. A program stream simply comprises the elementary streams belonging to it and usually contains variable length packets.

A transport stream comprises a succession of transport packets. Transport packets are a type of PES-packets. In some examples, each of the transport packets is 188-bytes long. The use of short, fixed length packets in transport streams means that the transport streams are not as susceptible to errors as program streams. Further, processing the transport packets through a standard error protection process, such as Reed-Solomon encoding may give each 188-byte-long transport packet additional error protection. The improved error resilience of a transport stream means that the transport stream has a better chance of surviving error-prone channels, such as those found in a broadcast environment. Given the increased error resilience of transport streams and the ability to carry many simultaneous programs in a transport stream, it might seem that transport streams are clearly the better of the two multiplexes (i.e., program streams and transport streams). However, the transport stream is a more sophisticated multiplex than the program stream and is consequently more difficult to create and to demultiplex.

The first byte of a transport packet may be a synchronization byte, which is 0x47. A single transport stream may carry many different programs, each comprising many packetized elementary streams. In addition, a transport packet includes a 13-bit Packet Identifier (PID) field. The PID field is used to distinguish transport packets containing the data of one elementary stream from transport packets carrying data of other elementary streams. It is the responsibility of the multiplexer to ensure that each elementary stream is awarded a unique PID value. The last byte of a transport packet is the continuity count field. The value of the continuity count field is incremented between successive transport packets belonging to the same elementary stream. Incrementing the value of the continuity count field enables a decoder, such as media decoder 64, to detect the loss or gain of a transport packet and potentially conceal errors that might otherwise result from the loss or gain of a transport packet.

Although an elementary stream to which a transport packet belongs may be determined based on a PID value of the transport packet, a decoder may need to be able to determine which elementary streams belong to which program. Accordingly, program specific information explicitly specifies the relationship between programs and component elementary streams. For instance, the program specific information may specify a relationship between a program and elementary streams belonging to the program. The program specific information of a transport stream may include a program map table (PMT), a program association table (PAT), a conditional access table, and a network information table.

Every program carried in a transport stream may be associated with a Program Map Table (PMT). A PMT is permitted to include data regarding more than one program. For instance, multiple programs carried in a transport stream may be associated with the same PMT. A PMT associated with a program gives details about the program and the elementary streams that comprise the program. For example, a program with number 3 may contain display content with PID 33, English audio with PID 57, Chinese audio with PID 60. In other words, in this example, the PMT may specify that an elementary stream whose transport packets include PID fields with values equal to 33 contains video of a program with a number (e.g., program_number) equal to 3, that an elementary stream whose transport packets include PID fields with values equal to 57 contains English audio of the program with number 3, and that an elementary stream whose transport packets include PID fields with values equal to 60 contains Spanish audio of the program with number 3.

Program-specific information of a program stream may include a program stream map (PSM). A PSM of a program stream provides a description of elementary streams in the program stream and the relationships of the elementary streams to one another. When carried in a Transport Stream, this structure shall not be modified. The PSM is present as a PES packet when the stream_id value is 0xBC.

As indicated above, the program-specific information of a transport stream may include a program association table (PAT). The PAT of a transport stream contains a complete list of all the programs available in the transport stream. The PAT may always have the PID value 0. In other words, transport packets having PID values equal to 0 contain the PAT. The PAT lists each respective program of a transport stream along with the PID value of the transport packets that contain the Program Map Table associated with the respective program. For instance, in the example PMT described above, the PAT may include information specifying that the PMT that specifies the elementary streams of program number 3 has a PID of 1001 and may include information specifying that another PMT has another PID of 1002. In other words, in this example, the PAT may specify that transport packets whose PID fields have values equal to 1001 contain the PMT of program number 3 and the PAT may specify that transport packets whose PID fields have values equal to 1002 contain the PMT of another program.

Furthermore, as indicated above, the program-specific information of a transport stream may include a network information table (NIT). The program number zero, specified in a PAT of a transport stream, has special meaning. Specifically, program number 0 points to the NIT. The NIT of a transport stream is optional and when present, the NIT provides information about the physical network carrying the transport stream. For instance, the NIT may provide information such as channel frequencies, satellite transponder details, modulation characteristics, service originator, service name and details of alternative networks available.

As indicated above, the program-specific information of a transport stream may include a conditional access table (CAT). In some examples, a CAT must be present if any elementary stream within a transport stream is scrambled. The CAT provides details of the scrambling system(s) in use and provides the PID values of transport packets that contain the conditional access management and entitlement information. MPEG-2 does not specify the format of this information.

In many instances, display content is a composite of multiple display content layers. For ease of explanation, this disclosure may refer to display content layers as simply "layers." Each respective layer may include conceptually separate display content. The display content of such layers may partially or completely overlap one another. In some examples, each different window of a window-based graphical user interface corresponds to a different layer. Furthermore, in some examples, popup notifications may correspond to layers. In some examples, taskbars and desktops in a window-based graphical user interface correspond to other layers. In some examples, the display content of at least some layers is at least partially transparent. For instance, in some examples, each layer may occupy an entire viewable area of a display screen, but transparent portions of the layers allow the display content of other layers to be seen. Furthermore, in some instances where the display content of a first layer is partially transparent, the display content of the first layer may be blended with the display content of a second layer below the first layer.

Figure 2:
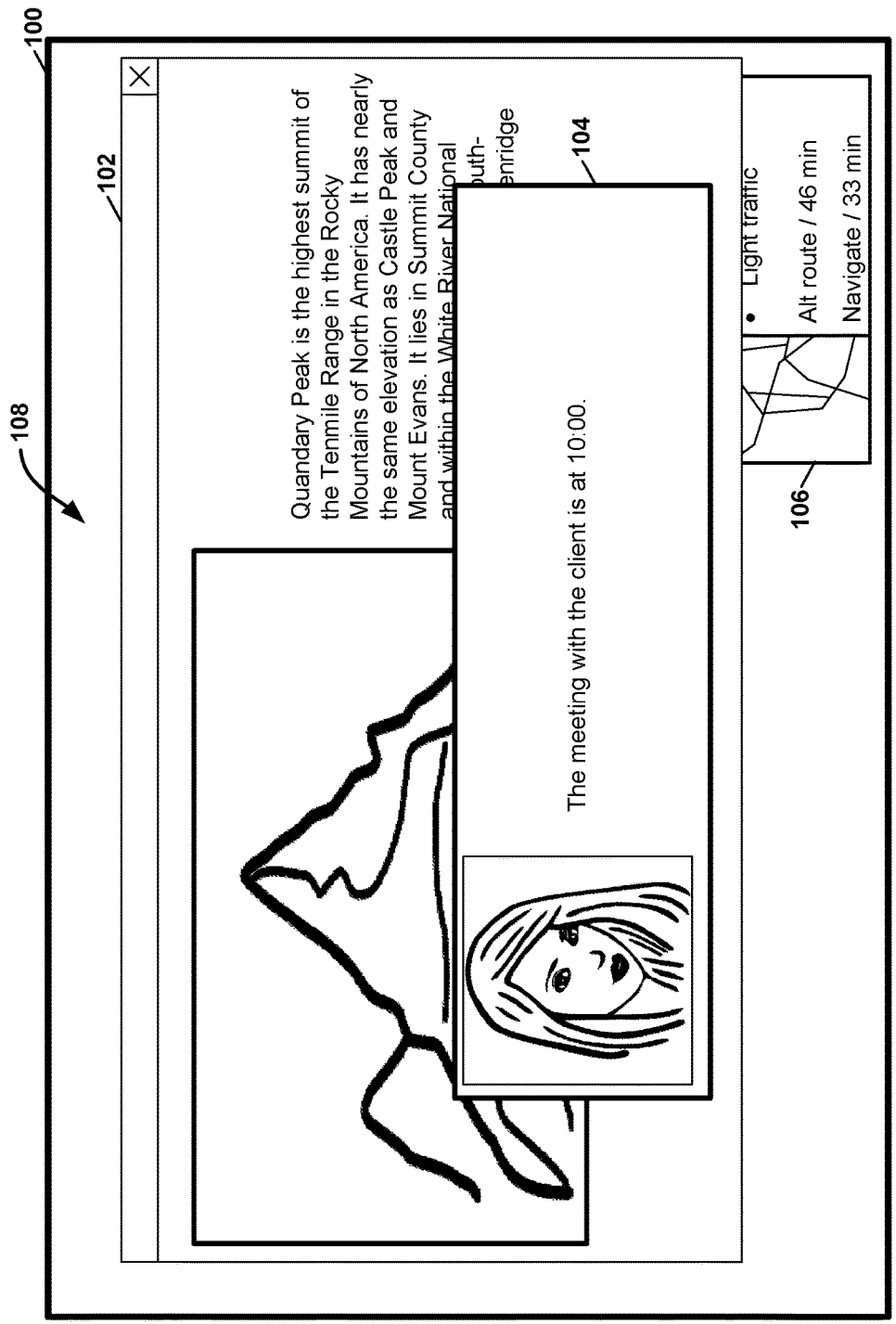
FIG. 2 is a conceptual diagram illustrating example display content.

FIG. 2 is a conceptual diagram illustrating example display content 100. Display content 100 typifies the display content that may be output for display by a modern personal computer or tablet. In the example of FIG. 2, display content 100 is a composite of the display content of several layers. For instance, display content 100 is a composite of a layer 102 containing a window of a web browser application, a layer 104 containing a notification from a colleague, a layer 106 that contains navigation information, and a background layer 108.

Figure 3:
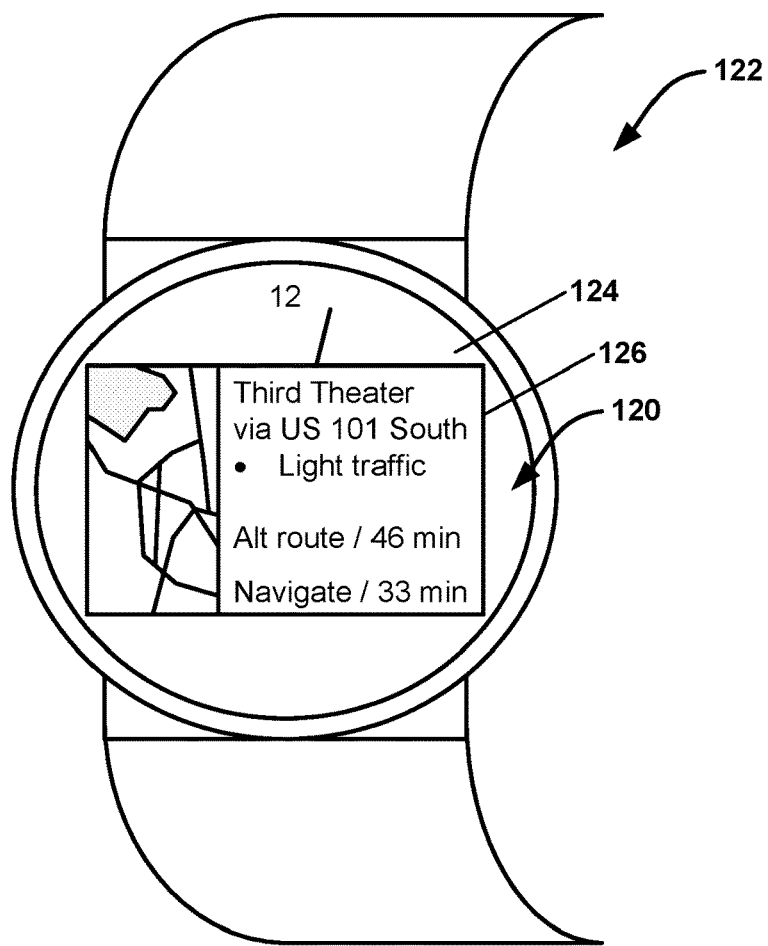
FIG. 3 is a conceptual diagram illustrating example display content displayed by a wearable device.

FIG. 3 is a conceptual diagram illustrating example display content 120 displayed by a wearable device 122. Display content 120 typifies the display content that may be output for display by a modern wearable device, such as a so-called smart watch. In the example of FIG. 3, display content 120 is a composite of a layer 124 containing a clock face and a layer 126 containing traffic information.

Conventionally, a source device of a wireless display system flattens the display content of layers to form composite display content, e.g., composite pictures. The source device then encodes the composite display content using a video codec, such as HEVC. The source device may then packetize the encoded pictures using a wireless display protocol, such as the Miracast™ protocol. Packetizing the encoded pictures using a wireless display protocol may involve encapsulating the encoded pictures in packets conforming to the wireless display protocol. The source device may then transmit the packetized encoded pictures over a wireless communication standard, such as an 802.11 protocol (i.e., a WiFi protocol). A sink device of the wireless display system may then decode the encoded pictures of the composite display content in much the same way that the sink device would decode any other type of display content, such as a movie. Thus, the paradigm is akin to streaming a movie of the composite display content displayed on the source device's screen.

When the source device flattens the display content of the layers, the source device produces to a single stream of pictures, where each of the pictures contains all display content displayed on the display screen at a respective individual moment. For instance, in the example of FIG. 2, a single picture may include all of display content 100. Similarly, in the example of FIG. 3, a single picture may include all of display content 120.

Flattening the layers may have the effect of reducing the complexity of the data transmitted from the source device to the sink device. Additionally, because display content of a first layer may obscure portions of the display content of a second layer, flattening the layers has the result that obscured portions of the display content of the second layer are not signaled from the source device to the sink device, potentially reducing the amount of transmitted data.

However, there are several drawbacks associated with flattening the display content of the layers in this manner. For example, the display content of a first layer may seldom change while the display content of a second layer changes with every frame. In this example, the source device may still need to transmit encoded display content for the first layer even though the display content of the first layer is not changing. For instance, in the example of FIG. 2, the display content of background layer 108 seldom changes while the display content of the other layers may change frequently. As a result, the source device may transmit a good deal of encoded display content for portions of the screen that do not change.

In another example drawback associated with flattening the display content of layers, the display content of particular layers may appear on the display of the source device, but it may not be desirable to have the display content of those particular layers appear on the display of the sink device. For example, a first layer may comprise a window showing a slide presentation that a user is presenting to an audience. In this example, a second layer may comprise a notification containing a text message. Typically, such a notification would instantly appear on the display screen of the user's source device. Because of flattening, the notification would also appear on the display screen of the sink device. Because the content of the text message may be sensitive or personal, the user may not want the notification to appear on the display screen of the sink device. Flattening the layers does not allow the user to keep the notification hidden.

This disclosure proposes techniques that implement a wireless display system in which the display content of layers is not flattened. Instead, source device 20 may generate a transport stream that includes one or more sub-streams. As described above, each sub-stream in a transport stream may comprise one or more programs and/or one or more elementary streams. In accordance with a technique of this disclosure, encoded data representing the display content of a different respective layer may be included in respective different sub-streams of the transport stream. For instance, each respective sub-stream may include a respective elementary stream containing encoded display content of a respective layer. In the example of FIG. 2, a first sub-stream may include data representing display content of layer 102, a second sub-stream may include data representing display content of layer 104, a third sub-stream may include data representing display content of layer 106, and a fourth sub-stream may include data representing display content of background layer 108. In the example of FIG. 3, a first sub-stream may include data representing display content of layer 124 and a second sub-stream may include data representing display content of layer 126.

Source device 20 may wirelessly transmit the transport stream to one or more sink devices, such as sink device 60, for display by the one or more sink devices. Sink device 60 may receive the transport stream. Sink device 60 may decode and composite the display content of one or more of the sub-streams of the transport stream. For instance, in the example of FIG. 3, wearable device 122 may receive the transport stream containing a sub-stream for layer 124 and a sub-stream for layer 126. Wearable device 122 may composite the display content of layer 124 and the display content of layer 126 to derive composite display content 120.

Thus, in the example of FIG. 1, source device 20 may composite display content of a plurality of layers to form composite display content. Additionally, source device 20 may output the composite display content for display. Source device 20 generates a transport stream comprising a plurality of sub-streams. Each respective sub-stream of the plurality of sub-streams may comprise data representing the display content of a respective layer of the plurality of layers. Source device 20 wirelessly transmits the transport stream to one or more sink devices for display by the one or more sink devices. Furthermore, in the example of FIG. 1, sink device 60 may wirelessly receive the transport stream from source device 20. Sink device 60 may composite the display content of two or more of the layers to generate composite display content. Sink device 60 may output the composite display content for display. In some instances, sink device 60 may output the display content of a single layer for display without compositing the display content of two or more of the layers. In the example of FIG. 1, TX/RX unit 32 of source device 20 may comprise a transmitter configured to wirelessly transmit the transport stream to the one or more sink devices for display by the one or more sink devices of the display content of one or more of the layers.

As indicated above, each program in a transport stream may be associated with a respective program number. Furthermore, a transport stream may include one or more PMTs. A PMT associated with a program may specify details about the elementary streams that comprise a program. For instance, the PMT may specify PID values of transport packets of elementary streams of a program. In accordance with a technique of this disclosure, an elementary stream of a program may comprise encoded display content of a layer. Additionally, the transport stream may include a PAT containing a list of programs available in the transport stream. Hence, in examples where the "sub-streams" are programs, the PAT may contain a list of programs containing encoded display content of layers. For instance, the PAT may specify the PID values of transport packets containing the PMTs associated with each of the programs, and hence, each of the layers.

Source device 20 may use the digital rights management systems of the transport stream to control the ability of sink devices to display particular layers. For instance, as briefly discussed above, the program-specific information of a transport stream may include a conditional access table (CAT). The CAT provides details of scrambling or encryption systems in use and provides PID values of transport packets of the transport stream to control access to particular programs or elementary streams that include encoded display content of layers.

In accordance with a technique of this disclosure, source device 20 may encrypt the content of transport packets associated with one or more layers. In some instances, source device 20 may encrypt the content of transport packets associated with all layers. The CAT associated with a program or elementary stream for a layer may specify how source device 20 encrypted the display content of the layer. For instance, source device 20 and sink device 60 may be configured for layer specific encryption using RTSP messages in Miracast™. Scrambling algorithms used in digital video broadcasting (DVB) systems may be used with this technique (DVB-CSA) along with any other existing scrambling methods. The CAT may be required if sink device 60 has conditional access to each layer being transmitted. If sink device 60 does not have access to a layer, sink device 60 should not be able to decrypt it.

If sink device 60 is not able to decrypt the display content for a layer, the display content that sink device 60 outputs for display is not composited from the display content of the layer. For instance, in the example of FIG. 2, the display content of layer 104 obscures a portion of the display content of layer 102. If sink device 60 is not able to decrypt the display content for layer 104, the portion of the display content of layer 102 obscured by the display content of layer 104 would be visible as though the display content of layer 104 did not exist. For instance, a user of sink device 60 would be able to see the rest of the picture in the display content of layer 102 and read the remainder of the text in the display content of layer 102. In this way, potentially sensitive information in the display content of layer 104 would not be output for display by sink device 60.

As indicated above, the display content of some layers change very seldom. Accordingly, rather than encoding the display content of such a layer using a video codec, such as a ITU-T H.264 (AVC) or ITU-T H.2645 (HEVC), it may be more efficient from a data compression standpoint to encode the display content of the layer using a still image compression technique or codec. Portable Network Graphics (PNG) is an example bitmap image file format for still image compression. Other still image compression techniques include the Graphics Interchange Format (GIF) and Joint Photographic Experts Group (JPEG) format. In some instances, the still image compression techniques are lossless.

As indicated above, each layer may correspond to a program in a transport stream. Furthermore, as indicated above, the transport stream is packet based. In examples where source device 20 uses a still image compression technique to encode a layer, source device 20 does not need to continuously send packets in the transport stream containing the encoded display content of the layer, but rather may send packets containing the encoded display content of the layer in response to the display content of the layer changing. In some examples, source device 20 may send packets containing the encoded display content of the layer on a periodic basis (e.g., once every 30 seconds), regardless of whether the display content of the layer has changed. Sink device 60 may be configured to assume the display content of a layer has not changed until sink device 60 receives a packet in the transport stream indicating the display content of the layer has changed.

In some examples, source device 20 may encode the display content of one or more layers using a video codec, such as H.264 or HEVC, while encoding the display content of other layers using a still image compression technique, such as PNG. For example, a first layer may include a window displaying a movie while a second layer may contain the user's background wallpaper image. In this example, source device 20 may encode the display content of the first layer using HEVC and source device 20 may encode the display content of the second layer using PNG. Thus, the transport stream may include a far larger number of transport packets containing encoded display content of the first layer than transport packets containing encoded display content of the second layer.

In some examples, source device 20 prioritizes the transmission of encoded display content of some layers over the transmission of encoded display content of other layers. In other words, source device 20 may implement a priority-based wireless-display data forwarding regime. In some such examples, source device 20 classifies layers as "clean" or "dirty." A "clean" layer is a layer whose current display content has been transmitted in the transport stream. In contrast, a "dirty" layer is a layer whose current display content has not yet been transmitted in the transport stream.

If there are concurrently multiple "dirty" layers, source device 20 may prioritize the "dirty" layers based on estimated workloads for transmission of the "dirty" layers or other factors. Such factors may include sizes of the "dirty" layers (e.g., number of pixels of the "dirty" layers), compression scores of the "dirty" layers, priority values of the "dirty" layers, and so on. In some examples, source device 20 may estimate the workload for transmission of a "dirty" layer based on width multiplied by height in pixels. Based on this prioritization of the "dirty" layers, source device 20 may schedule transmission of encoded display content for the "dirty" layers. For instance, source device 20 may schedule transmission of encoded display content of a higher-priority "dirty" layer sooner than transmission of encoded display content of a lower-priority "dirty" layer.

Figure 4:
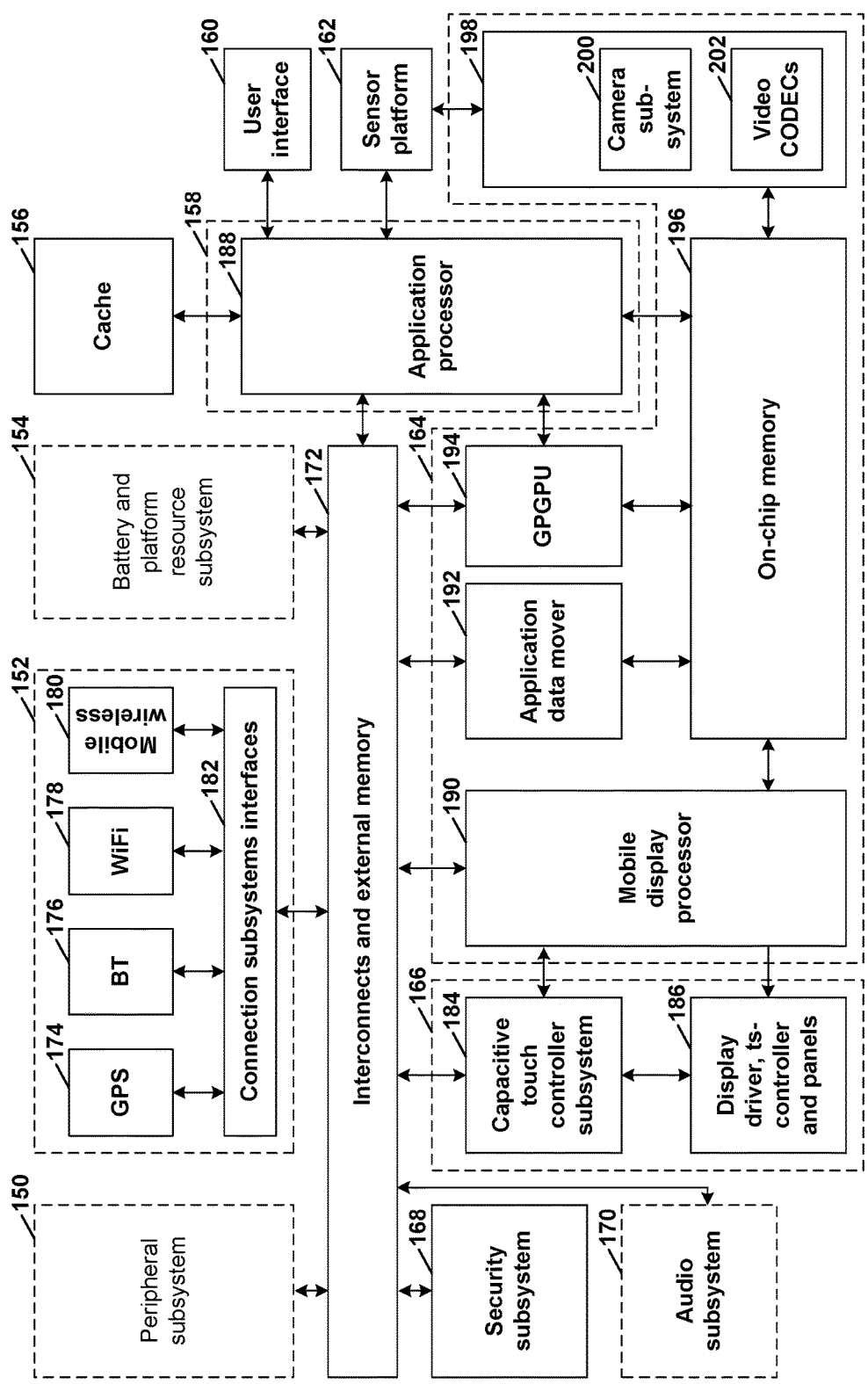
FIG. 4 is a block diagram illustrating an example implementation of the source device, in accordance with a technique of this disclosure.

FIG. 4 is a block diagram illustrating an example implementation of source device 20, in accordance with a technique of this disclosure. Other implementations of source device 20 may include more, fewer, or different components.

In the example of FIG. 4, source device 20 includes a peripheral subsystem 150, a connections subsystem 152, a battery and platform resource subsystem 154, a cache 156, an application processor subsystem 158, a user interface 160, a sensor platform 162, a graphics subsystem 164, a display subsystem 166, a security subsystem 168, an audio subsystem 170, and interconnects and external memory 172. Interconnects and external memory 172 may include memory 22 of FIG. 1. Processors 28 of FIG. 1 may be included in one or more of application processor subsystem 158 and graphics subsystem 164. In the example of FIG. 4, arrows show communication paths between components.

Peripheral subsystem 150 enables source device 20 to communicate with peripheral devices, such as secure digital (SD) cards, Universal Serial Bus (USB) devices, and so on. Peripheral subsystem 150 may include external modules and devices and peripheral devices and interfaces. Connections subsystem 152 enables source device 20 to perform wireless communication. Connections subsystem 152 may include TX/RX unit 32 of FIG. 1. In the example of FIG. 4, connections subsystem 152 includes a GPS unit 174, a Bluetooth (BT) unit 176, a WiFi unit 178, a mobile wireless unit 180, and connection subsystems interfaces 182. Battery and platform resource subsystem 154 may include a battery for source device 20, power management functions, and clock management functions. For instance, in some examples, battery and platform resource subsystem 154 may include a battery, a charging circuit, a power manager, a temperature compensated crystal oscillator (TCXO), phase-locked loop (PLL) units, clock generators, a battery monitor, and a platform resource/power manager. Cache 156 may temporarily store data for quick access by application processor subsystem 158. Display subsystem 166 may enable source device 20 to output data for display on a touch-sensitive display unit and receive indications of user input from the touch-sensitive display unit. Display subsystem 166 may include display 24 of FIG. 1. In the example of FIG. 4, display subsystem 166 includes a capacitive touch controller subsystem 184 and a display driver, touch screen controller and panels 186. Security subsystem 168 may handle particular security-related operations in source device 20. Audio subsystem 170 may enable source device to process and, in some instances, output audio. Audio subsystem 170 may include speaker 26 of FIG. 1. In some instances, audio subsystem 170 may include an audio processing subsystem, an audio codecs subsystem, and a headphone unit.

Application processor subsystem 158 may execute application programs. In the example of FIG. 4, application processor subsystem 158 includes an application processor 188. Application processor 188 may include one or more microprocessors, each of which may include one or more processing cores. In some examples, application processor 188 may include other types of integrated circuits, such as application-specific integrated circuits, signal processors, and so on. Application processor 188 may output data to interconnects and external memory 172 for transmission to other subsystems or for storage in external memory. Application processor 188 may also receive and send data from user interface 160, sensor platform 162, and graphics subsystem 164.

Graphics subsystem 164 processes graphical content, such as display content, for source device 20. In the example of FIG. 4, graphics subsystem 164 includes a mobile display processor 190, an application data mover 192, a general purpose graphics processing unit (GPGPU) 194, on-chip memory 196, and media input subsystem 198. Mobile display processor 190 is responsible for processing display content to be output for display by source device 20 and may be responsible for processing display content for transmission in a wireless display system. For instance, mobile display processor 190 may output display content data for local display as well as write back the display content data into system memory to be consumed by a Miracast™ stack for delivery over a wireless protocol, such as WiFi. In accordance with a technique of this disclosure, when preparing display content for transmission in a wireless display system, mobile display processor 190 may keep layers separate instead of compositing them into a single stream of composite pictures.

Application data mover 192 may move application data (e.g., data generated or consumed by application programs) from on-chip memory 196 to interconnects and external memory 172. On-chip memory 196 includes one or more memory units for storage of data for use by graphics subsystem 164. GPGPU 194 includes electronic circuits specially designed to rapidly manipulate and alter memory to accelerate the creation of images in a frame buffer intended for output to a display. On-chip memory 196 may include the frame buffer. In the example of FIG. 4, media input subsystem 198 includes a camera subsystem 200 and video codec unit 202. Sensor platform 162 may include a camera. Camera subsystem 200 may receive and process graphics data (e.g., still pictures or moving video) from the camera. Camera subsystem 200 may store the processed display content in on-chip memory 196. Video codec unit 202 may encode and decode display content. Video codec unit 202 may receive the display content from on-chip memory 196 and may store encoded or decoded display content to on-chip memory 196.

Figure 5A:
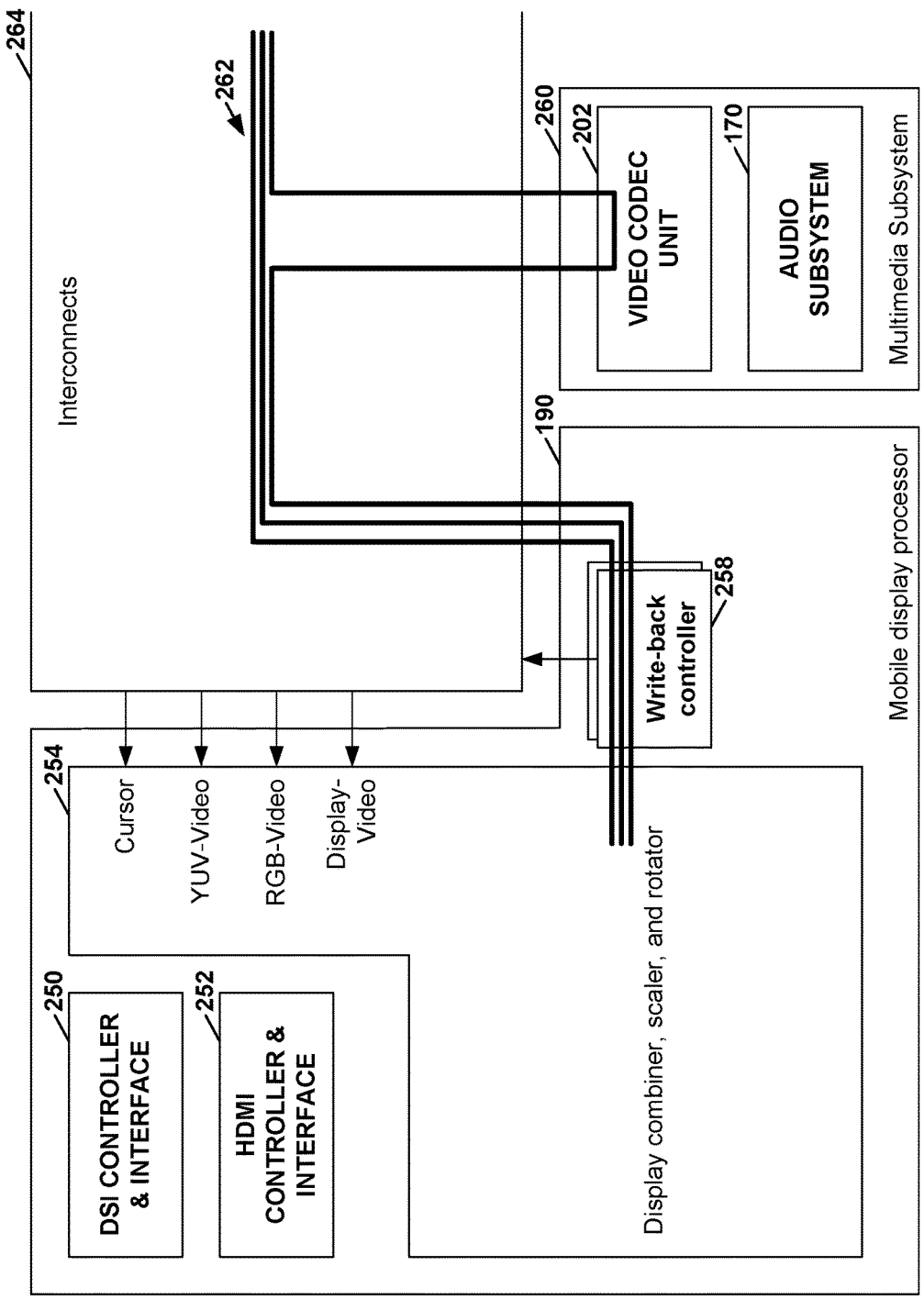
FIG. 5A is a block diagram illustrating a first portion of a first example data path in the source device, in accordance with a technique of this disclosure.

FIG. 5A is a block diagram illustrating a first portion of a first example data path in source device 20, in accordance with a technique of this disclosure. In the example of FIG. 5A, mobile display processor 190 includes a digital serial interface (DSI) controller and interface 250, a High-Definition Media Interface (HDMI) controller and interface 252, a display combiner, scaler, and rotator (DCSR) 254, and one or more write-back controllers 258. Furthermore, in the example of FIG. 5A, a multimedia subsystem 260 includes video codec unit 202 and audio subsystem 170.

Figure 5B:
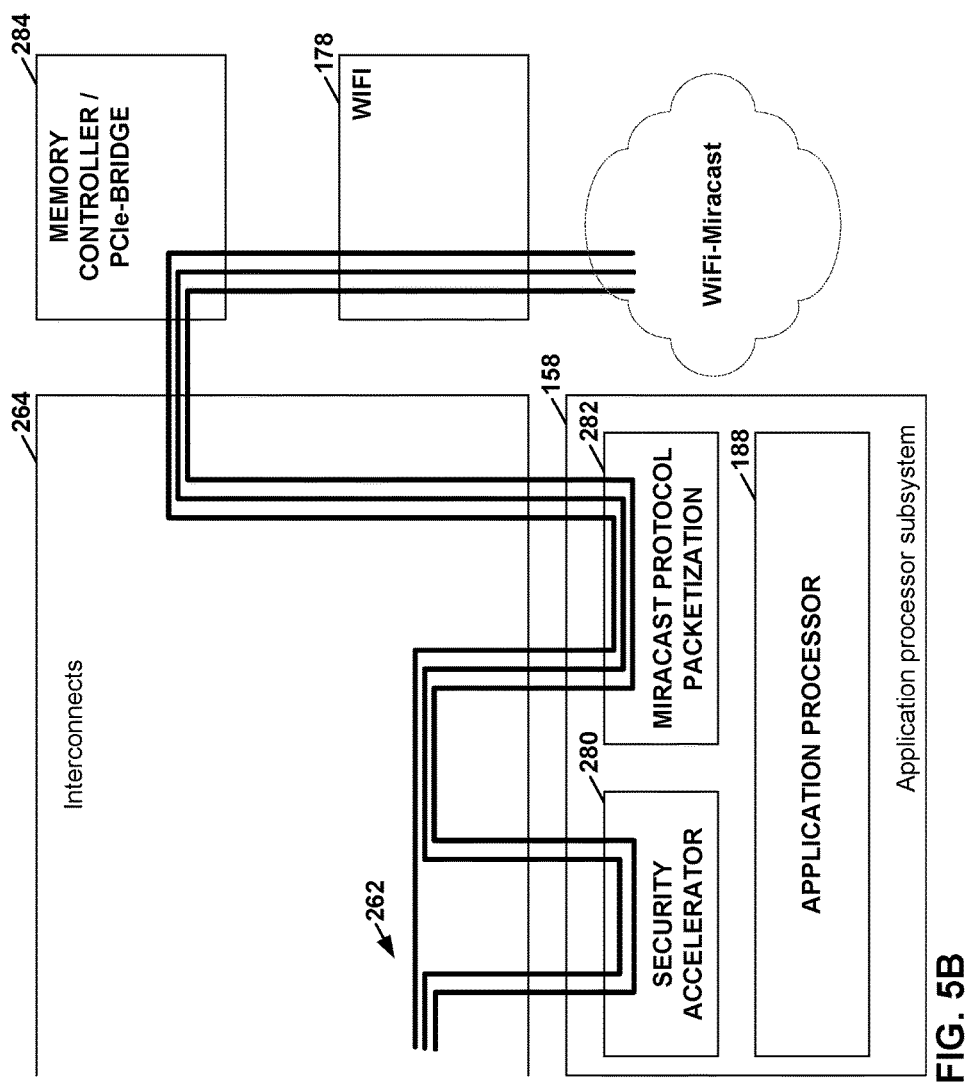
FIG. 5B is a block diagram illustrating a second portion of the first example data path in the source device, in accordance with a technique of this disclosure.

In the example of FIG. 5A, DCSR 254 generates data streams 262 and provides data streams 262 to one or more of write-back controllers 258. As shown in the example of FIG. 5A and FIG. 5B, and in other examples, data streams 262 for different layers may be kept separate throughout the data path through source device 20. Write-back controllers 258 may write content from mobile display processor 190 back into system memory for consumption by a wireless display (e.g., Miracast™) stack. Each of data streams 262 includes data representing the display content of a layer. One or more of write-back controllers 258 may send data streams 262 on interconnects 264. Interconnects 264 may comprise the interconnects of interconnects and external memory 172 shown in FIG. 4. As shown in the example of FIG. 5A, video codec unit 202 may encode the display content of one or more of data streams 262. For instance, video codec unit 202 may encode the display content of a data stream using H.264 or HEVC. As shown in the example of FIG. 5A, video codec unit 202 does not necessarily encode the display content of each of data streams 262.

FIG. 5B is a block diagram illustrating a second portion of the first example data path of FIG. 5A, in accordance with a technique of this disclosure. The example of FIG. 5B is a continuation of the data path in source device 20 shown in FIG. 5A. In the example of FIG. 5B, application processor subsystem 158 includes a security accelerator 280 and a Miracast protocol packetization unit 282 in addition to application processor 188. In some examples, security accelerator 280 and/or Miracast protocol packetization unit 282 may be applications performed by application processor 188 or may be separate hardware units. As shown in the example of FIG. 5B, security accelerator 280 may receive one or more of data streams 262 from interconnects 264. Security accelerator 280 may encrypt data representing display content of one or more of data streams 262. In this way, security accelerator 280 may help implement the conditional access to particular sub-streams of a transport stream.

Furthermore, in the example of FIG. 5B, Miracast protocol packetization unit 282 packetizes data streams 262 according to a Miracast™ protocol. Thus, Miracast protocol packetization unit 282 outputs a separate stream of Miracast packets for each of data streams 262. The Miracast protocol stack for packetizing audio/visual content uses MPEG2 Transport Stream (MPEG2TS) and Real Time Protocol (RTP) protocols. Miracast protocol packetization unit 282 may first packetize each video stream into a packetized elementary stream (PES), then packetize each PES into MPEG2TS packets, and then multiplex one or more MPEG2TS packets inside RTP packets before the RTP packets are transmitted over a wireless protocol, such as WiFi. In other examples, source device 20 may packetize data streams 262 according to other wireless display protocols.

In the example of FIG. 5B, a memory controller/PCIe bridge 284 receives the packetized data streams 262 from interconnects 264. Memory controller/PCIe bridge 284 may be an instance of connection subsystems interfaces 182 (FIG. 2). WiFi unit 178 may receive the packetized data streams 262 from memory controller/PCIe bridge 284 and may wirelessly transmit the packetized data streams 262.

Figure 6A:
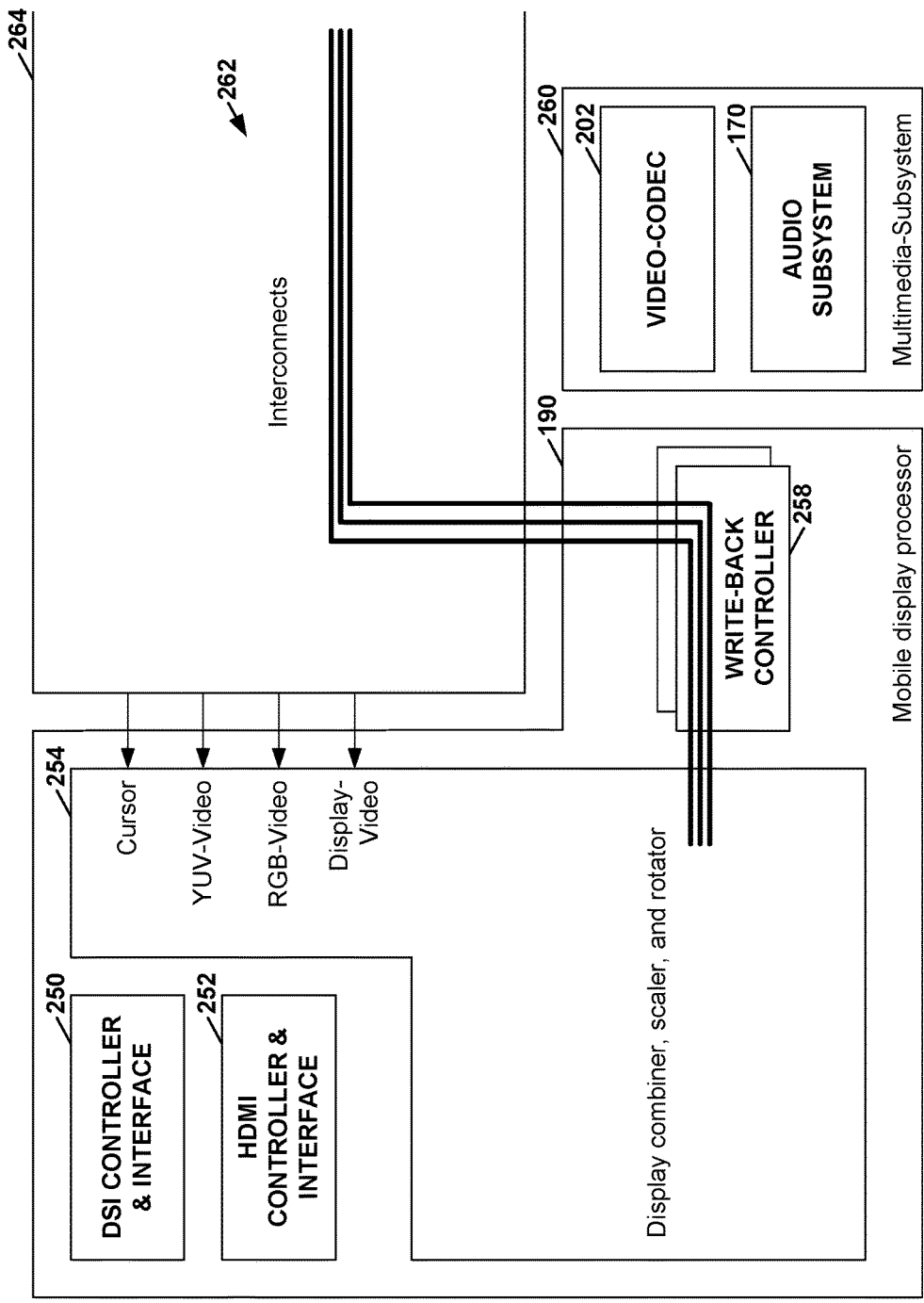
FIG. 6A is a block diagram illustrating a first portion of a second example data path in the source device, in accordance with a technique of this disclosure.
Figure 6B:
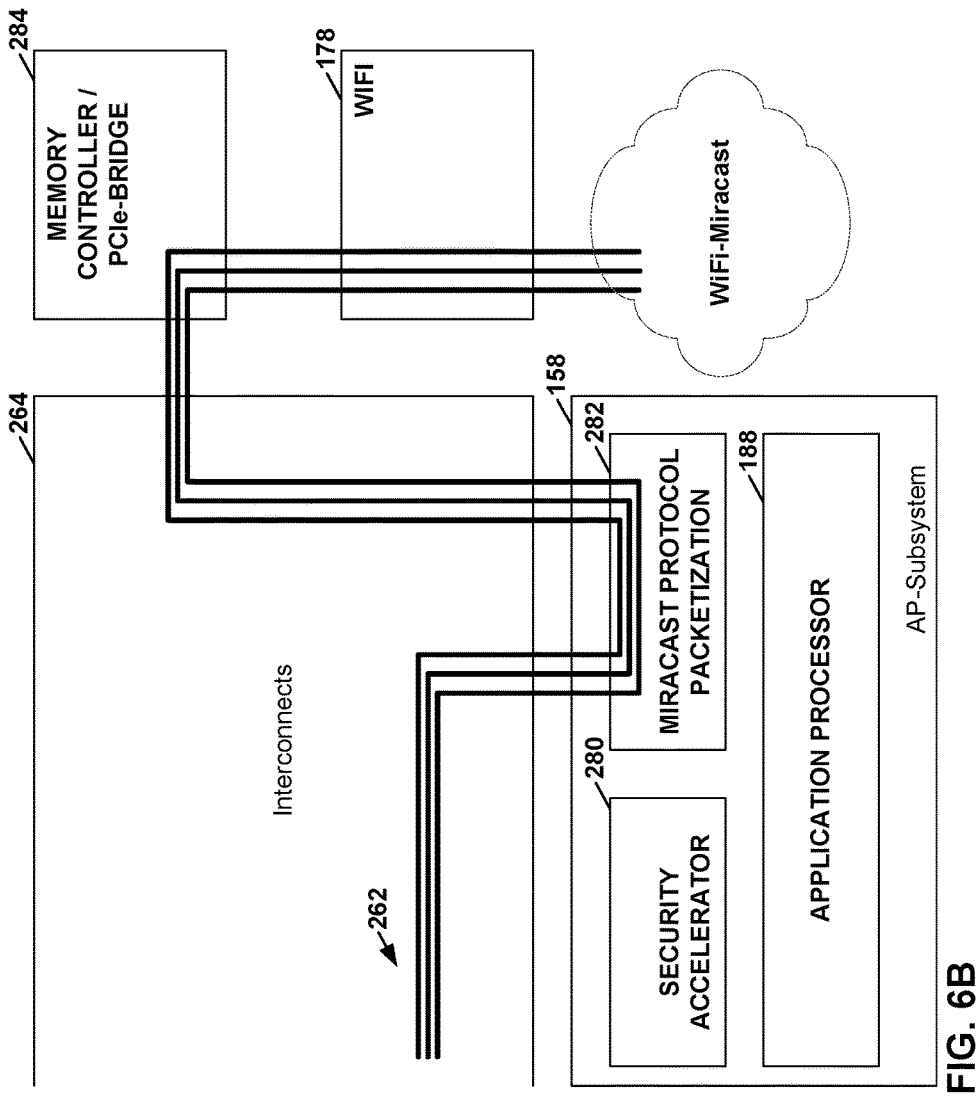
FIG. 6B is a block diagram illustrating a second portion of the second example data path in the source device, in accordance with a technique of this disclosure.

FIG. 6A is a block diagram illustrating a first portion of a second example data path in the source device, in accordance with a technique of this disclosure. FIG. 6B is a block diagram illustrating a second portion of the second example data path in the source device, in accordance with a technique of this disclosure. The second data path shown in FIG. 6A and FIG. 6B is similar to that shown in FIG. 5A and FIG. 5B and includes the same components. For instance, in the example of FIG. 6A and FIG. 6B, DCSR 254 outputs data streams 262 to one or more of write-back controllers 258. One or more of write-back controllers 258 outputs data streams 262 and sends data streams 262 on interconnects 264 to Miracast protocol packetization unit 282. In contrast to the example of FIG. 5A and FIG. 5B, data streams 262 are already encoded and encrypted (e.g., scrambled) before being output by mobile display processor 190. As before, Miracast protocol packetization unit 282 packetizes data streams 262 according to a Miracast Protocol™. WiFi unit 178 wirelessly transmits the packetized data streams 262.

Figure 7A:
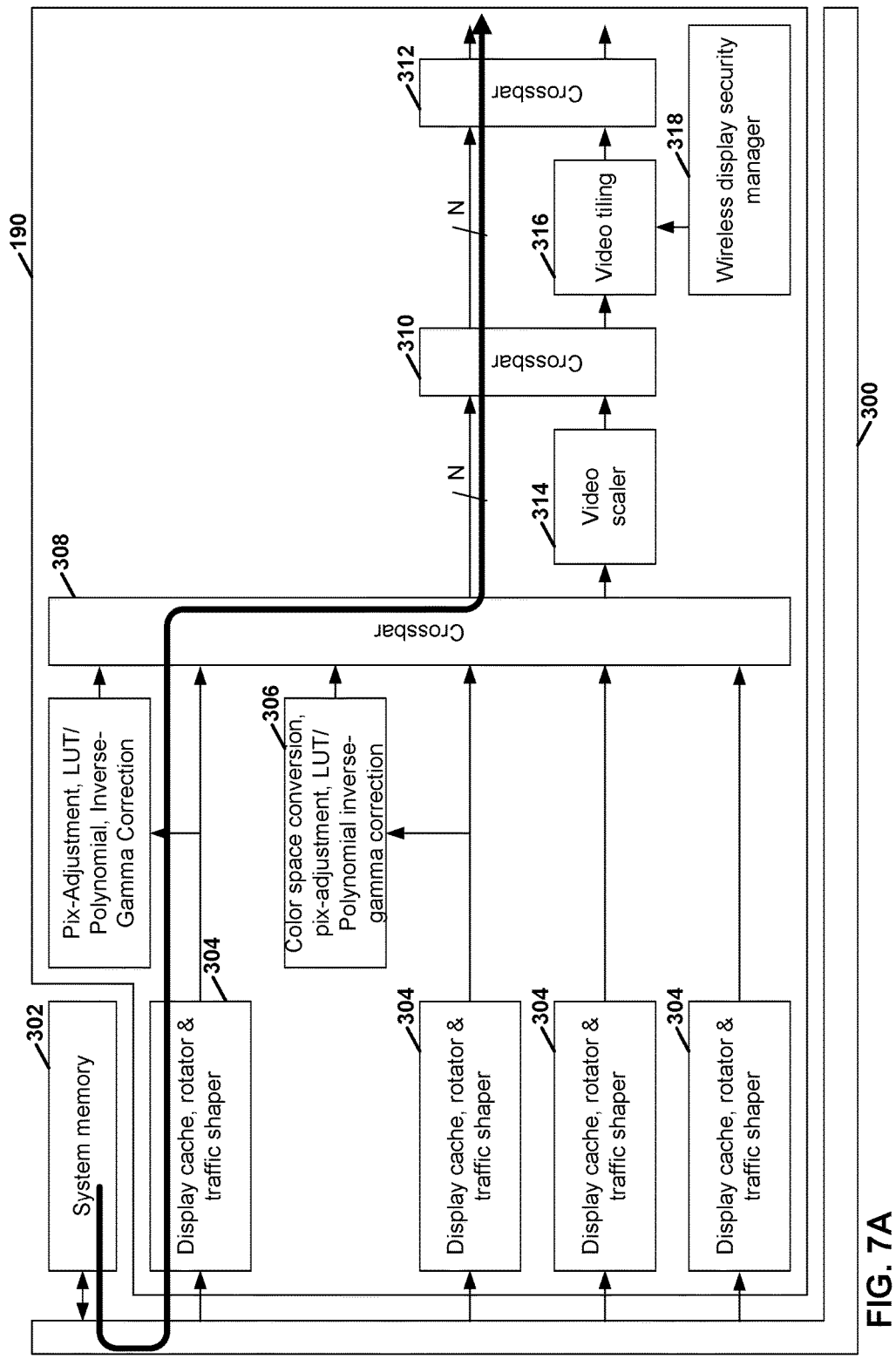
FIG. 7A is a block diagram illustrating a first portion of an example implementation of mobile display processor of the source device, in accordance with a technique of this disclosure.
Figure 7B:
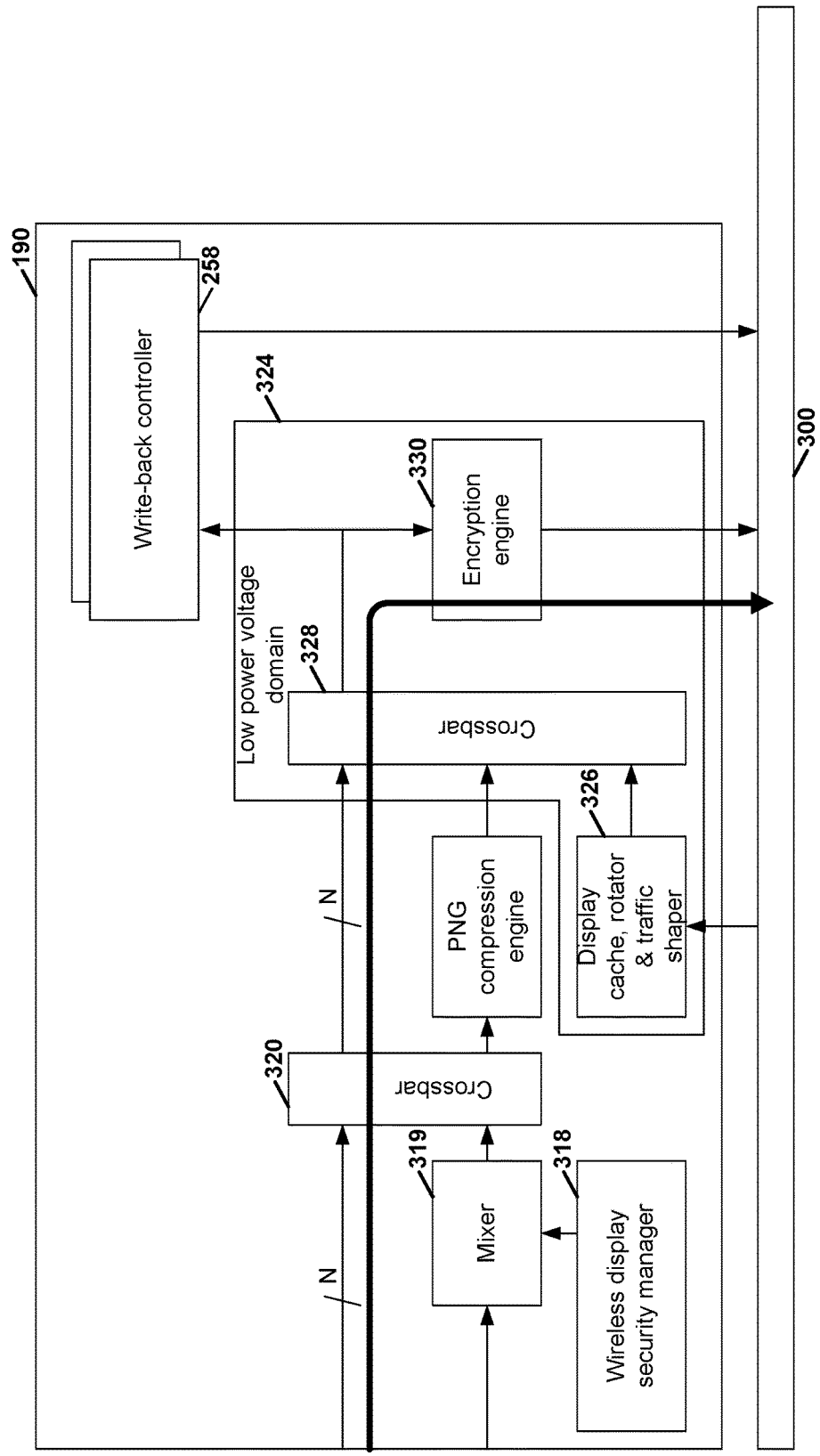
FIG. 7B is a block diagram illustrating a second portion of the example implementation of the mobile display processor of FIG. 7A, in accordance with a technique of this disclosure.
Figure 7C:
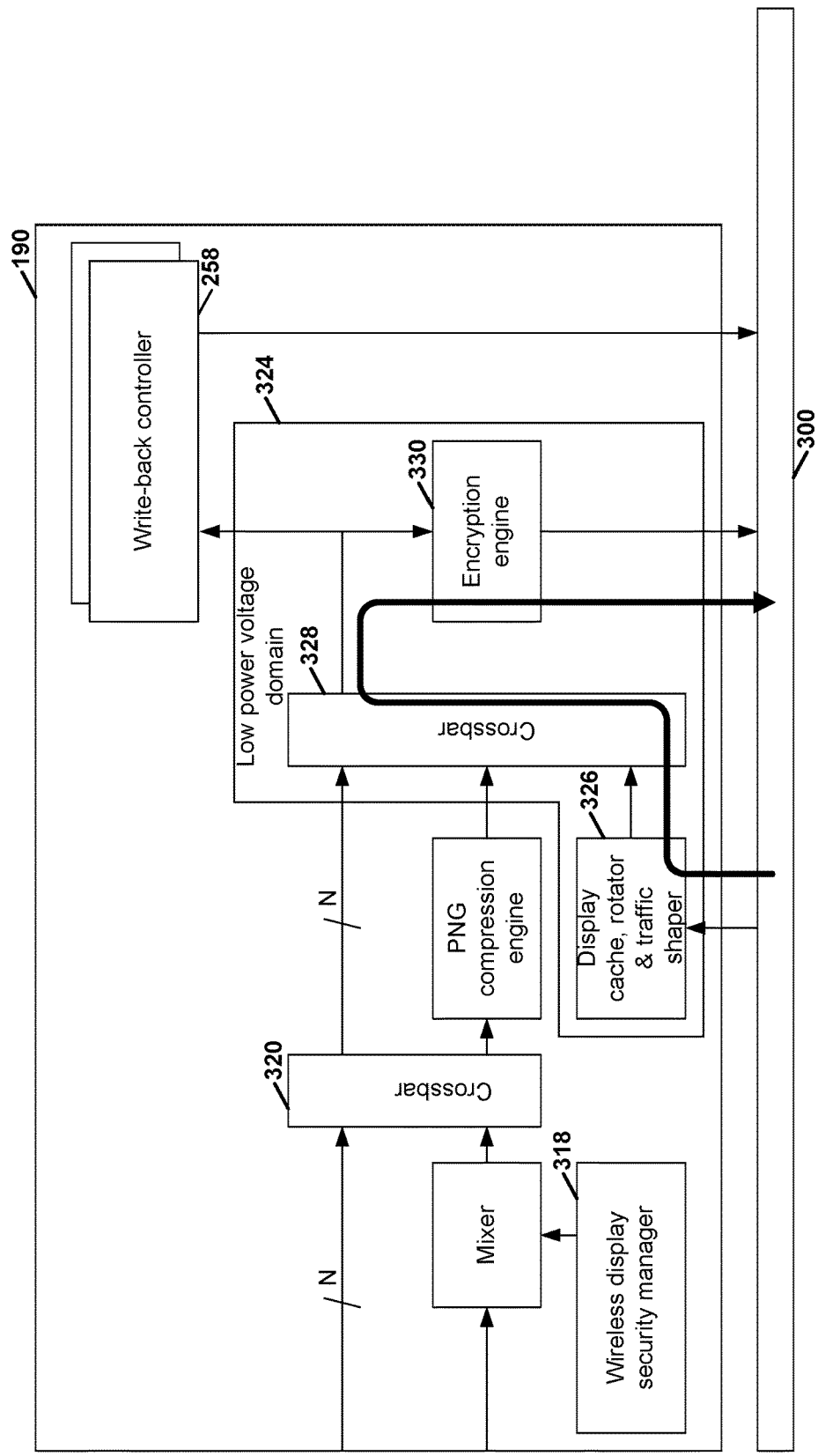
FIG. 7C is a block diagram illustrating an example data path in the second portion of the example implementation of the mobile display processor of FIG. 7A and FIG. 7B.

FIG. 7A is a block diagram illustrating a first portion of an example implementation of mobile display processor 190, in accordance with a technique of this disclosure. FIG. 7B is a block diagram illustrating a second portion of the example implementation of mobile display processor 190 of FIG. 7A, in accordance with a technique of this disclosure. FIG. 7C is a block diagram illustrating an example data path in the second portion of the example implementation of mobile display processor 190 of FIG. 7A and FIG. 7B. FIG. 7A and FIG. 7B illustrate a first example data path in which data corresponding to each layer to be transmitted over the Miracast protocol may be encrypted and compressed in hardware before the data is provided to the Miracast protocol stack (e.g., Miracast protocol packetization unit 282 of FIG. 6B). Handling the data in hardware may result in reduced power consumption by avoiding high-level operating system (HLOS) involvement for scrambling and compression.

In the example of FIG. 7A, mobile display processor 190 is coupled to interconnects 300. Interconnects 300 may be communicatively coupled to system memory 302. Collectively, interconnects 300 and system memory 302 may form interconnects and external memory 172 shown in the example of FIG. 4. Furthermore, in the example of FIG. 7A, mobile display processor 190 comprises a set of one or more units 304 that provide display cache, rotator and traffic shaper functionality. Additionally, in the example of FIG. 7A, mobile display processor 190 includes a unit 306 for color space conversion, pixel-adjustment, and lookup table (LUT)/polynomial inverse gamma correction. In the example of FIG. 7A, mobile display processor 190 also includes crossbars 308, 310, 312, a video scaler 314, a video tiling unit 316, and a wireless display security manager 318. In the example of FIG. 7B, mobile display processor 190 further comprises a mixer 319, a crossbar 320, a PNG compressing engine 322, and write-back controllers 258. Furthermore, in the example of FIG. 7B, mobile display processor 190 comprises a low power voltage domain 324. Low power voltage domain 324 may correspond to hardware units within mobile display processor 190 that may operate at a power level and/or voltage level lower than other components of mobile display processor 190 and/or graphics subsystem 164 of FIG. 4. In the examples of FIG. 7B and FIG. 7C, low power voltage domain 324 comprises one or more units 326 providing display cache, rotator, and traffic shaper functionality. Additionally, low power voltage domain 324 comprises a crossbar 328 and an encryption engine 330. In the examples of FIG. 7A, FIG. 7B, and FIG. 7C, crossbars 308, 310, 312, 320, and 328 receive input from one or more source units and selectively output the input to one or more receiving units.

As shown in the example of FIG. 7A, one or more of units 304 may receive and process data corresponding to a layer from system memory 302 via interconnects 300. Crossbar 308 may receive the data processed by one or more of units 304 and may forward the data to crossbar 310, which may in turn forward the data to crossbar 312. Crossbar 312 may forward the data to crossbar 320 (FIG. 7B and FIG. 7C). Furthermore, crossbar 320 may forward the data to crossbar 328 in low power voltage domain 324. Crossbar 328 may forward the data to encryption engine 330. Encryption engine 330 may encrypt the data and send the encrypted data to interconnects 300 for transmission.

As indicated briefly above, FIG. 7C is a block diagram illustrating an example data path in the second portion of the example implementation of the mobile display processor of FIG. 7A and FIG. 7B. In the example of FIG. 7C, units 326 receive, from interconnects 300, data corresponding to particular layers. In the example of FIG. 7C, such data may already be compressed (e.g., using the PNG format). Units 326 may process the data and forward the processed data to encryption engine 330. Units 326 correspond to post processing engines of captured content. For instance, if a 90 degrees' rotation is needed to properly display it on the sink device, units 326 would do the appropriate rotation OR, prioritizing the content based on its importance before being pushed downstream so the content gets the appropriate priority by the transmit engine. Encryption engine 330 may encrypt the data and write the encrypted data back to system memory (FIG. 7A) via interconnects 300. The data path shown in the example of FIG. 7C may reduce power consumption even more by avoiding display processor functionality.

Figure 8:
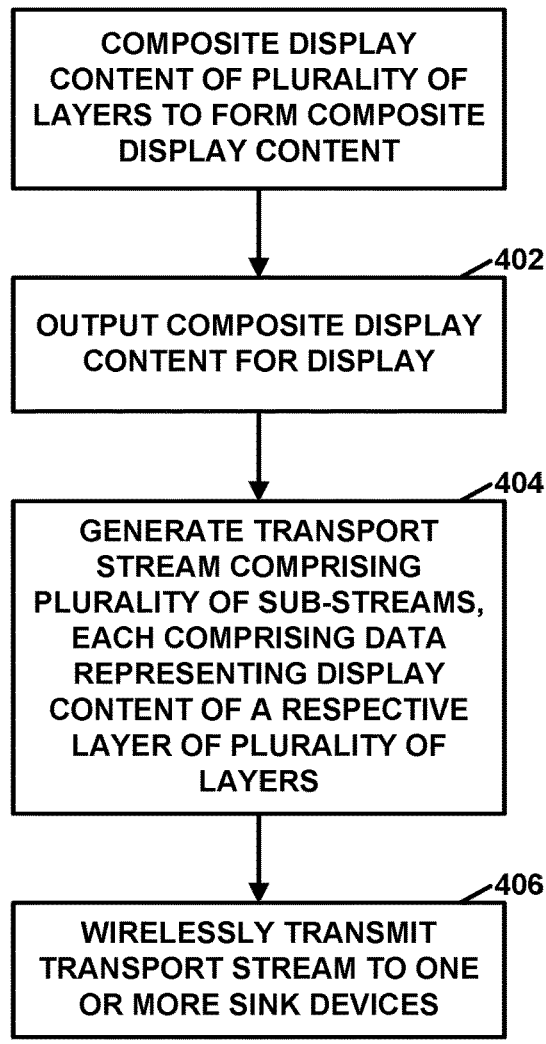
FIG. 8 is a flowchart illustrating an example operation of the source device, in accordance with a technique of this disclosure.
Figure 9:
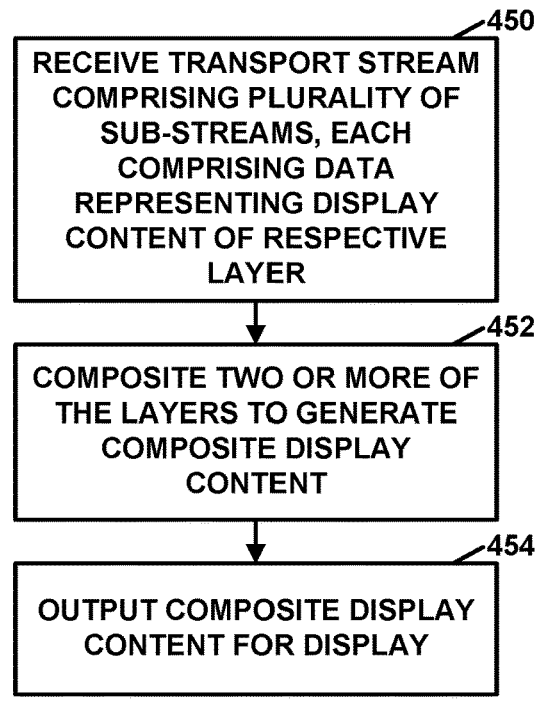
FIG. 9 is a flowchart illustrating an example operation of the sink device, in accordance with a technique of this disclosure.
Figure 10:
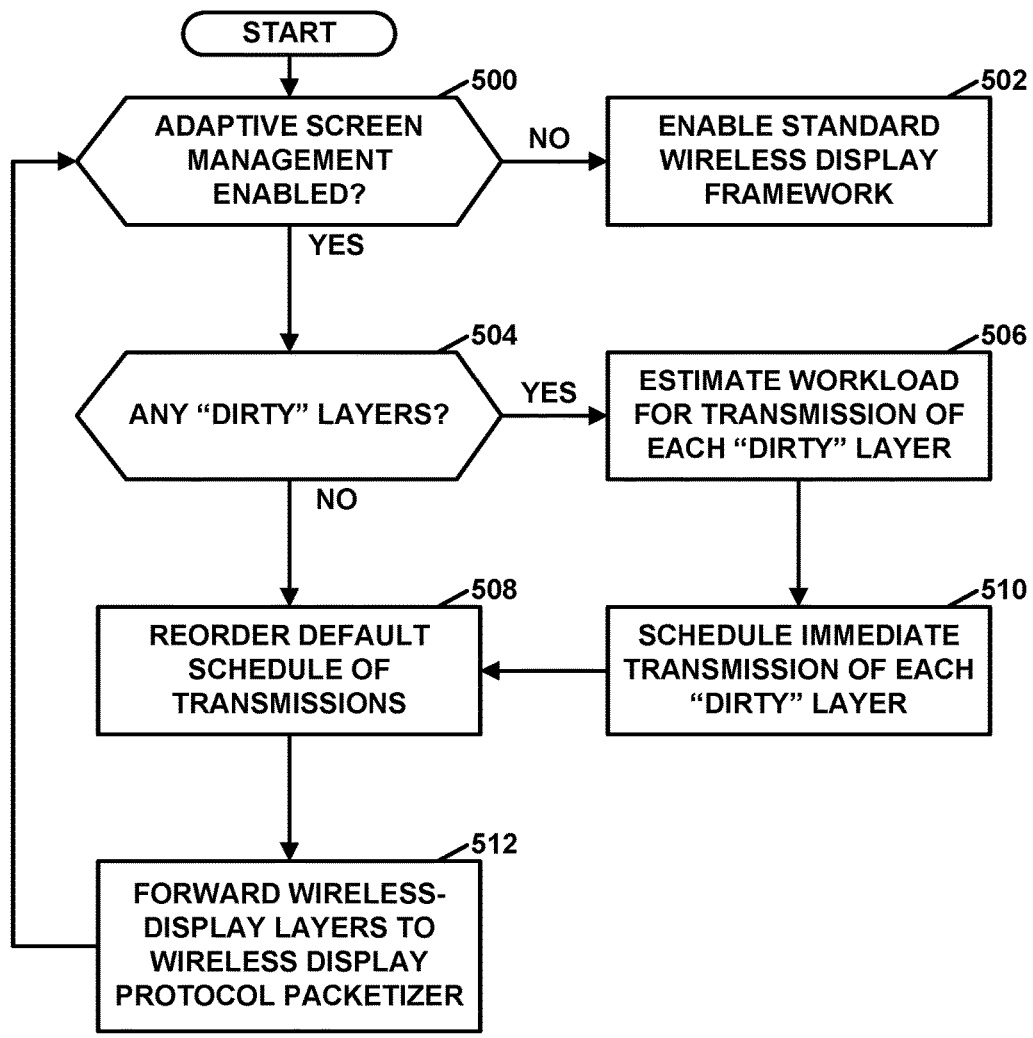
FIG. 10 is a flowchart illustrating an example operation of the source device for prioritizing transmission of packets containing data representing particular layers.

FIG. 8 is a flowchart illustrating an example operation of source device 20, in accordance with a technique of this disclosure. The flowcharts of this disclosure are provided as examples. Particular techniques of this disclosure may be implemented using more, fewer, or different actions or actions performed in different orders or in parallel. Furthermore, although FIG. 8, FIG. 9, and FIG. 10 are described with regard to source device 20 and sink device 60, the operations of FIG. 8, FIG. 9, and FIG. 10 may be performed by devices other than those described in the example of FIG. 1.

In the example of FIG. 8, source device 20 composites display content of a plurality of layers to form composite display content (400). For instance, source device 20 may form a series of pictures (e.g., images) from the non-transparent portions of the layers. Each of the layers has a respective depth. The pictures formed by compositing the display content of the layers do not include portions of display content of layers obscured by non-transparent portions of higher (i.e., less deep) layers. Additionally, source device 20 output the composite display content for display (402). Thus, the "plurality of layers" may be those layers that are composited to form the display content output for display by source device 20. In other examples, source device 20 does not composite the display content of the layers and/or, in some examples, output the composite display content for display. Furthermore, in some examples, the transport stream may include one or more sub-streams that contain encoded display content that does not correspond to a layer of display content output for display by source device 20. In some examples, the "plurality of layers" does not include all layers composited to form the composite display content output for display by source device 20.

Furthermore, in the example of FIG. 8, source device 20 generates a transport stream comprising a plurality of sub-streams (404). Each respective sub-stream of the plurality of sub-streams may comprise data representing the display content of a respective layer of the plurality of layers. In some examples, each respective sub-stream of the plurality of sub-streams includes a respective series of packets that each include data formatted according to a wireless display protocol, such as a Miracast Protocol™. As described elsewhere in this disclosure, source device 20 may encode the display content of one or more of the layers according to a still image compression codec, such as the PNG codec. To provide security and digital rights management, source device 20 may individually encrypt the data representing the display content of one or more of the layers. Thus, if there is a first sink device and a second sink device, the first sink device may be configured to decode the data representing the display content of a first subset of the layers (e.g., layer A, B, and C) and the second sink device may be configured to decode the data representing the second subset of the layers (e.g., layers C, D, and E). For instance, source device 20 may encrypt the first subset of the plurality of layers in a way that the first sink device, but not the second sink device, is able to decode the data representing the display content of the first subset of the plurality of layers. Moreover, source device 20 may encrypt the second, different subset of the plurality of layers in a way that the second sink device, but not the first sink device, is able to decode the data representing the display content of the second subset of the plurality of layers.

Source device 20 may wirelessly transmit the transport stream to one or more sink devices for display by the one or more sink devices, such as sink device 60, of the display content of one or more of the layers (406). In some examples, source device 20 may prioritize the transmission of packets containing data representing display content of particular layers. For instance, source device 20 may identify one or more modified layers (e.g., "dirty" layers) of the plurality of layers. In this example, for each respective modified layer of the one or more modified layers, a current version of the respective layer differs from a most recent version of the respective layer transmitted to sink device 60. In this example, source device 20 may prioritize, based on an estimated workload of transmitting packets carrying data of the modified layers, forwarding of packets carrying data of a first layer of the plurality of layers over forwarding of packets carrying data of a second layer of the plurality of layers.

FIG. 9 is a flowchart illustrating an example operation of sink device 60, in accordance with a technique of this disclosure. In the example of FIG. 9, sink device 60 wirelessly receives a transport stream from source device 20 (450). In some examples, the transport stream is an MPEG transport stream, such as an MPEG-2 transport stream. For instance, TX/RX 62 of sink device 60 may receive the transport stream. The transport stream comprises one or more sub-streams, such as programs or elementary streams. For instance, the transport stream may comprise a plurality of sub-streams. Each respective sub-stream of the one or more of sub-streams comprises data representing display content of a respective layer of a plurality of layers that when composited form display content that is output for display by the source device. In some examples, the transport stream may also comprise sub-streams that do not comprise data representing display content of a layer composited to form display content that is output for display by the source device. In some examples, each respective sub-stream of the plurality of sub-streams comprises a respective series of packets that each include data formatted according to a wireless display protocol, such as a Miracast Protocol™.

Furthermore, in the example of FIG. 9, sink device 60 composites the display content of two or more of the layers to generate composite display content (452). In the example of FIG. 1, media decoder 64 may generate the composite display content. In some examples, prior to compositing the display content, sink device 60 may decode the display content of one or more layers of the plurality of layers using a still image compression codec, such as the PNG codec. In some examples, sink device 60 may decode display content of one or more of the layers using a moving pictures compression codec, such as H.264 or HEVC. In some examples, as part of compositing the display content, sink device 60 may generate the composite display content such that the composite display content includes an image in which non-transparent portions of the display content of a first layer of the two or more layers at least partially obscure non-transparent portions of the display content of a second layer of the two or more layers. In this example, the transport stream may include data representing the obscured non-transparent portions of the display content of the second layer.

As discussed above, the data representing display content of some layers may be encrypted or scrambled. In some such examples, sink device 60 may receive one or more Conditional Access Tables (CATs) in the transport stream and may determine, based on the one or more CATs, that sink device 60 is able to decrypt display content of a first sub-stream of the plurality of sub-streams but not display content of a second sub-stream of the plurality of sub-streams. In this example, the first sub-stream may include data representing display content of a first layer of the plurality of layers and the second sub-stream comprising data representing display content of a second layer of the plurality of layers. In this example, sink device 60 may composite the display content of the first layer and a third layer, but not the second layer, to form the composite display content. Sink device 60 may output the composite display content for display (454). For instance, sink device 60 may output the composite display content for display on display 66.

FIG. 10 is a flowchart illustrating an example operation of source device 20 for prioritizing transmission of packets containing data representing particular layers. In the example of FIG. 10, source device 20 determines whether adaptive screen management is enabled (500). Adaptive screen management involves managing layers based on workload. For instance, layers may be prioritized for transmission based on workload, such as amount of "dirty" area within a layer. In response to determining adaptive screen management is not enabled ("NO" branch of 500), source device 20 may enable a standard wireless display framework (502). In other words, source device 20 may use a wireless display framework in which there is no prioritization of transmission of packets containing data representing particular layers.

On the other hand, in response to determining adaptive screen management is enabled ("YES" branch of 500), source device 20 may determine whether there are currently any "dirty" layers (504). As discussed above, a "dirty" layer is a layer whose current display content has not yet been transmitted in the transport stream. If there are one or more "dirty" layers ("YES" branch of 504), source device 20 may estimate a workload for transmission of each of the "dirty" layers (506). In some examples, source device 20 may estimate the workload for transmission of a layer based on one or more factors, such as a size, compression score, and priority value.

Source device 20 may schedule immediate transmission of each of the "dirty" layers (510). Additionally, source device 20 may reorder, based on the estimated workload for transmission of each "dirty" layer, a default schedule of transmission of packets containing data representing all layers (508). Source device 20 may then forward wireless display layers to a wireless display protocol packetizer (e.g., a WiFi-Miracast protocol packetizer) for wireless transmission according to the reordered schedule of transmissions (512).

The following paragraphs describe some, but not all, examples of this disclosure.

Example 1

A method for wireless display of display content, the method comprising: compositing, by a source device, display content of a plurality of layers to form composite display content; outputting, by the source device, for display, the composite display content; generating, by the source device, a transport stream comprising a plurality of sub-streams, each respective sub-stream of the plurality of sub-streams comprising data representing the display content of a respective layer of the plurality of layers; and wirelessly transmitting, by the source device, the transport stream to one or more sink devices for display by the one or more sink devices of the display content of one or more of the layers.

Example 2

The method of example 1, wherein each respective sub-stream of the plurality of sub-streams comprises a respective series of packets that each include data formatted according to a wireless display protocol.

Example 3

The method of examples 1 or 2, further comprising: encoding, by the source device, the display content of a first layer of the plurality of layers according to a still image compression codec.

Example 4

The method of example 3, wherein the still image compression codec is a Portable Network Graphics (PNG) codec.

Example 5

The method of any of examples 1-4, further comprising: individually encrypting, by the source device, the data representing the display content of one or more layers of the plurality of layers.

Example 6

The method of any of examples 1-5, wherein: the one or more sink devices include a first sink device and a second sink device, and the method further comprises encrypting a first subset of the plurality of layers in a way that the first sink device, but not the second sink device, is able to decode the data representing the display content of the first subset of the plurality of layers; and encrypting a second, different subset of the plurality of layers in a way that the second sink device, but not the first sink device, is able to decode the data representing the display content of the second subset of the plurality of layers.

Example 7

The method of any of examples 1-6, further comprising: identifying, by the source device, one or more modified layers of the plurality of layers, wherein, for each respective modified layer of the one or more modified layers, a current version of the respective layer differs from a most recent version of the respective layer transmitted to the one or more sink devices; and prioritizing, by the source device, based on an estimated workload of transmitting packets carrying data of the modified layers, forwarding of packets carrying data of a first layer of the plurality of layers over forwarding of packets carrying data of a second layer of the plurality of layers.

Example 8

The method of any of examples 1-7, wherein the source device is one of: a telephone handset, a tablet computer, or a personal computer.

Example 9

A method for wireless display of display content, the method comprising: wirelessly receiving, by a sink device, a transport stream from a source device, the transport stream comprising a plurality of sub-streams, each respective sub-stream of the plurality of sub-streams comprising data representing display content of a respective layer of a plurality of layers that when composited form display content that is output for display by the source device; compositing, by the sink device, the display content of two or more of the layers to generate composite display content; and outputting, by the sink device, the composite display content for display.

Example 10

The method of example 9, wherein each respective sub-stream of the plurality of sub-streams comprises a respective series of packets that each include data formatted according to a wireless display protocol.

Example 11

The method of examples 9 or 10, further comprising: decoding, by the sink device, the display content of a particular layer of the plurality of layers using a still image compression codec.

Example 12

The method of example 11, wherein the still image compression codec is a Portable Network Graphics (PNG) codec.

Example 13

The method of examples 11 or 12, further comprising: decoding, by the sink device, display content of another layer of the plurality of layers using a moving pictures compression codec.

Example 14

The method of any of examples 9-13, wherein: compositing the display content comprises generating, by the sink device, the composite display content such that the composite display content comprises an image in which non-transparent portions of the display content of a first layer of the two or more layers at least partially obscure non-transparent portions of the display content of a second layer of the two or more layers, and the transport stream includes data representing the obscured non-transparent portions of the display content of the second layer.

Example 15

The method of any of examples 9-14, wherein: receiving the transport stream comprises receiving, by the sink device, one or more Conditional Access Tables (CATs) in the transport stream, the method further comprising determining, by the sink device, based on the one or more CATs, that the sink device is able to decrypt a first sub-stream of the plurality of sub-streams but not a second sub-stream of the plurality of sub-streams, the first sub-stream comprising data representing display content of a first layer of the plurality of layers, the second sub-stream comprising data representing display content of a second layer of the plurality of layers, and compositing, by the sink device, the display content of the two or more layers to generate the composite display content comprises compositing, by the sink device, the display content of the first layer and a third layer, but not the second layer, to form the composite display content.

Example 16

The method of any of examples 9-15, wherein the sink device is one of: a television, a video projector, and a wearable computing device.

Example 17

A source device of a wireless display system, the source device comprising: one or more processors configured to: composite display content of a plurality of layers to form composite display content; output, for display, the composite display content; and generate a transport stream comprising a plurality of sub-streams, each respective sub-stream of the plurality of sub-streams comprising data representing the display content of a respective layer of the plurality of layers; and a transmitter configured to wirelessly transmit the transport stream to one or more sink devices for display by the one or more sink devices of the display content of one or more of the layers.

Example 18

The source device of example 17, wherein each respective sub-stream of the plurality of sub-streams comprises a respective series of packets that each include data formatted according to a wireless display protocol.

Example 19

The source device of examples 17 or 18, wherein the one or more processors are configured to: encode the display content of a first layer of the plurality of layers according to a still image compression codec.

Example 20

The source device of any of examples 17-19, wherein the one or more processors are configured to: individually encrypt the data representing the display content of one or more layers of the plurality of layers.

Example 21

The source device of example 20, wherein: the one or more sink devices include a first sink device and a second sink device, and the one or more processors are configured to: encrypt a first subset of the plurality of layers in a way that the first sink device, but not the second sink device, is able to decode the data representing the display content of the first subset of the plurality of layers; and encrypt a second, different subset of the plurality of layers in a way that the second sink device, but not the first sink device, is able to decode the data representing the display content of the second subset of the plurality of layers.

Example 22

The source device of any of examples 17-21, wherein the one or more processors are further configured to: identify one or more modified layers of the plurality of layers, wherein, for each respective modified layer of the one or more modified layers, a current version of the respective layer differs from a most recent version of the respective layer transmitted to the one or more sink devices; and prioritize, based on an estimated workload of transmitting packets carrying data of the modified layers, forwarding of packets carrying data of a first layer of the plurality of layers over forwarding of packets carrying data of a second layer of the plurality of layers.

Example 23

The source device of any of examples 17-22, wherein the source device is one of: a telephone handset, a tablet computer, or a personal computer.

Example 24

A sink device of a wireless display system, the sink device comprising: a receiver configured to wirelessly receive a transport stream from a source device, the transport stream comprising a plurality of sub-streams, each respective sub-stream of the plurality of sub-streams comprising data representing display content of a respective layer of a plurality of layers that when composited form display content that is output for display by the source device; and one or more processors configured to: composite the display content of two or more of the layers to generate composite display content; and output the composite display content for display.

Example 25

The sink device of example 24, wherein each respective sub-stream of the plurality of sub-streams comprises a respective series of packets that each include data formatted according to a wireless display protocol.

Example 26

The sink device of examples 24 or 25, wherein the one or more processors are configured to: decode the display content of a particular layer of the plurality of layers using a still image compression codec.

Example 27

The sink device of example 26, wherein the one or more processors are configured to: decode display content of another layer of the plurality of layers using a moving pictures compression codec.

Example 28

The sink device of any of examples 24-27, wherein the one or more processors are configured to generate the composite display content such that the composite display content comprises an image in which non-transparent portions of the display content of a first layer of the two or more layers at least partially obscure non-transparent portions of the display content of a second layer of the two or more layers, and the transport stream includes data representing the obscured non-transparent portions of the display content of the second layer.

Example 29

The sink device of any of examples 24-28, wherein the one or more processors are configured to: receive one or more Conditional Access Tables (CATs) in the transport stream; determine, based on the one or more CATs, that the sink device is able to decrypt a first sub-stream of the plurality of sub-streams but not a second sub-stream of the plurality of sub-streams, the first sub-stream comprising data representing display content of a first layer of the plurality of layers, the second sub-stream comprising data representing display content of a second layer of the plurality of layers; and composite the display content of the first layer and a third layer, but not the second layer, to form the composite display content.

Example 30

The sink device of any of examples 24-29, wherein the sink device is one of: a television, a video projector, and a wearable computing device.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method for wireless display of display content, the method comprising:
generating, by a source device, display content of a plurality of layers, the plurality of layers including at least a first layer and a second layer;
compositing, by the source device, display content of the plurality of layers to form composite display content, the display content of the first layer obscuring a non-transparent portion of the display content of the second layer in the composite display content;
outputting, by the source device, for display, the composite display content;
encrypting, by the source device, the display content of the plurality of layers;
generating, by the source device, a transport stream, the transport stream comprising a plurality of sub-streams and one or more Conditional Access Tables (CATs), each respective sub-stream of the plurality of sub-streams comprising data representing the encrypted display content of a respective layer of the plurality of layers, wherein:
the sub-stream that comprises data representing the encrypted display content of the second layer includes encrypted display content representing the obscured non-transparent portion of the display content of the second layer, and
for each respective layer of the plurality of layers, a CAT of the one or more CATs that is associated with the respective layer specifies how the source device encrypted the display content of the respective layer;
identifying, by the source device, a plurality of modified layers of the plurality of layers, wherein, for each respective modified layer of the plurality modified layers, a current version of the respective layer differs from a most recent version of the respective layer transmitted to one or more sink devices;
for each respective modified layer of the plurality of modified layers, determining an estimated workload of transmitting packets carrying data of the respective modified layer based on a size of the respective modified layer;
prioritizing, by the source device, based on the estimated workloads of transmitting packets carrying data of the plurality of modified layers, forwarding of packets carrying data of a first modified layer of the plurality of modified layers over forwarding of packets carrying data of a second modified layer of the plurality of modified layers; and
wirelessly transmitting, by the source device, the transport stream to the one or more sink devices for display by the one or more sink devices of the display content of one or more of the plurality of layers.

2. The method of claim 1, wherein each respective sub-stream of the plurality of sub-streams comprises a respective series of packets that each include data formatted according to a wireless display protocol.

3. The method of claim 1, further comprising:
encoding, by the source device, the display content of the first layer of the plurality of layers according to a still image compression codec.

4. The method of claim 3, wherein the still image compression codec is a Portable Network Graphics (PNG) codec.

5. The method of claim 1, wherein:
the one or more sink devices include a first sink device and a second sink device, and encrypting the display content of the plurality of layers comprises:
encrypting a first subset of the plurality of layers in a way that the first sink device, but not the second sink device, is able to decode data representing the display content of the first subset of the plurality of layers; and
encrypting a second, different subset of the plurality of layers in a way that the second sink device, but not the first sink device, is able to decode data representing the display content of the second subset of the plurality of layers.

6. The method of claim 1, wherein the source device is one of: a telephone handset, a tablet computer, or a personal computer.

7. A source device of a wireless display system, the source device comprising:
one or more processors configured to:
generate display content of a plurality of layers, the plurality of layers including at least a first layer and a second layer;
composite display content of the plurality of layers to form composite display content, the display content of the first layer obscuring a non-transparent portion of the display content of the second layer in the composite display content;
output, for display, the composite display content;
encrypt the display content of the plurality of layers;
generate a transport stream, the transport stream comprising a plurality of sub-streams and one or more Conditional Access Tables (CATs), each respective sub-stream of the plurality of sub-streams comprising data representing the encrypted display content of a respective layer of the plurality of layers, wherein:
the sub-stream that comprises data representing the encrypted display content of the second layer includes encrypted display content representing the obscured non-transparent portion of the display content of the second layer, and
for each respective layer of the plurality of layers, a CAT of the one or more CATs that is associated with the respective layer specifies how the source device encrypted the display content of the respective layer;
identify a plurality of modified layers of the plurality of layers, wherein, for each respective modified layer of the plurality modified layers, a current version of the respective layer differs from a most recent version of the respective layer transmitted to one or more sink devices;
for each respective modified layer of the plurality of modified layers, determine an estimated workload of transmitting packets carrying data of the respective modified layer based on a size of the respective modified layer;
prioritize, based on the estimated workloads of transmitting packets carrying data of the plurality of modified layers, forwarding of packets carrying data of a first modified layer of the plurality of modified layers over forwarding of packets carrying data of a second modified layer of the plurality of modified layers; and
a transmitter configured to wirelessly transmit the transport stream to the one or more sink devices for display by the one or more sink devices of the display content of one or more of the plurality of layers.

8. The source device of claim 7, wherein each respective sub-stream of the plurality of sub-streams comprises a respective series of packets that each include data formatted according to a wireless display protocol.

9. The source device of claim 7, wherein the one or more processors are configured to:
encode the display content of the first layer of the plurality of layers according to a still image compression codec.

10. The source device of claim 7, wherein:
the one or more sink devices include a first sink device and a second sink device, and
the one or more processors are configured such that, as part of encrypting the display content of the plurality of layers, the one or more processors:
encrypt a first subset of the plurality of layers in a way that the first sink device, but not the second sink device, is able to decode data representing the display content of the first subset of the plurality of layers; and
encrypt a second, different subset of the plurality of layers in a way that the second sink device, but not the first sink device, is able to decode data representing the display content of the second subset of the plurality of layers.

11. The source device of claim 7, wherein the source device is one of: a telephone handset, a tablet computer, or a personal computer.

* * * * *